US011908424B2

(12) United States Patent
Kim et al.

(10) Patent No.: US 11,908,424 B2
(45) Date of Patent: Feb. 20, 2024

(54) ELECTRONIC DEVICE AND METHOD TO AUTOMATICALLY CONTROL THE BRIGHTNESS OF ELECTRONIC DEVICE

(71) Applicant: Samsung Electronics Co., Ltd., Gyeonggi-do (KR)

(72) Inventors: Minho Kim, Gyeonggi-do (KR); Gilyoung Noh, Gyeonggi-do (KR); Taejin Park, Gyeonggi-do (KR); Dongin Kim, Gyeonggi-do (KR); Hyosun Kim, Gyeonggi-do (KR); Jaehun Lim, Gyeonggi-do (KR); Hyojong Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/577,545

(22) Filed: Jan. 18, 2022

(65) Prior Publication Data

US 2022/0223115 A1 Jul. 14, 2022

Related U.S. Application Data

(63) Continuation of application No. PCT/KR2022/000278, filed on Jan. 7, 2022.

(30) Foreign Application Priority Data

Jan. 14, 2021 (KR) .................. 10-2021-0004971

(51) Int. Cl.
*G09G 3/34* (2006.01)

(52) U.S. Cl.
CPC ... *G09G 3/3406* (2013.01); *G09G 2320/0626* (2013.01); *G09G 2320/08* (2013.01); *G09G 2354/00* (2013.01); *G09G 2360/144* (2013.01)

(58) Field of Classification Search
CPC ......... G09G 3/3406; G09G 2320/0626; G09G 2320/08; G09G 2354/00; G09G 2360/144; G09G 3/32
See application file for complete search history.

(56) References Cited

U.S. PATENT DOCUMENTS

| 6,331,843 | B1 | 12/2001 | Kasahara et al. |
| 8,760,475 | B2 * | 6/2014 | Hsieh ................ G09G 5/00 |
| | | | 345/77 |

(Continued)

FOREIGN PATENT DOCUMENTS

| JP | 8-292752 A | 11/1996 |
| JP | 11-231825 A | 8/1999 |

(Continued)

OTHER PUBLICATIONS

International Search Report dated Apr. 13, 2022.
Written Opinion dated Apr. 13, 2022.

*Primary Examiner* — Benyam Ketema
(74) *Attorney, Agent, or Firm* — Cha & Reiter, LLC

(57) ABSTRACT

An electronic device according to an embodiment may include a display, a touch sensor, an illuminance sensor configured to generate illuminance information, a memory configured to store brightness data relating the ambient illuminance to brightness of the display, and a processor. The processor may be configured to identify the illuminance information from the illuminance sensor, configure the brightness of the display as first brightness, based on the illuminance information and the brightness data, change the brightness of the display to second brightness, based on a user input, acquire event information for an operation in which the brightness of the display is changed by the user input, reconfigure the brightness data stored in the memory, based on the event information, and determine the brightness of the display according to a brightness value mapped (Continued)

in the reconfigured brightness data to the illuminance information identified by the illuminance sensor.

20 Claims, 9 Drawing Sheets

(56) References Cited

U.S. PATENT DOCUMENTS

| | | | | |
|---|---|---|---|---|
| 9,424,804 B2* | 8/2016 | Jung | | G09G 5/10 |
| 10,446,093 B2* | 10/2019 | Lee | | G09G 3/342 |
| 10,997,927 B2 | 5/2021 | Kang et al. | | |
| 11,211,032 B2* | 12/2021 | Kim | | G09G 5/10 |
| 11,244,652 B2* | 2/2022 | Kim | | G09G 5/10 |
| 2009/0207154 A1* | 8/2009 | Chino | | G06F 1/3262 |
| | | | | 345/173 |
| 2010/0177111 A1* | 7/2010 | Abe | | G09G 3/3406 |
| | | | | 345/589 |
| 2012/0071149 A1* | 3/2012 | Bandyopadhyay | | H04M 1/67 |
| | | | | 455/418 |
| 2013/0021349 A1* | 1/2013 | Kohtoku | | G02F 1/13318 |
| | | | | 345/207 |
| 2014/0021868 A1* | 1/2014 | Cho | | G09G 5/10 |
| | | | | 315/158 |
| 2015/0138122 A1* | 5/2015 | Cho | | G06F 1/1684 |
| | | | | 345/173 |
| 2016/0117996 A1* | 4/2016 | Huang | | G09G 3/20 |
| | | | | 345/207 |
| 2017/0357473 A1* | 12/2017 | Kim | | G06F 1/1681 |
| 2018/0061344 A1* | 3/2018 | Kurokawa | | G09G 3/3233 |
| 2018/0373395 A1* | 12/2018 | Kim | | G01J 1/32 |
| 2020/0098336 A1* | 3/2020 | Kim | | G09G 3/3611 |
| 2020/0152724 A1 | 5/2020 | Cho et al. | | |
| 2020/0242985 A1* | 7/2020 | Cho | | G06F 3/0412 |
| 2020/0349898 A1* | 11/2020 | Kurokawa | | G09G 3/3629 |
| 2021/0158777 A1* | 5/2021 | Kim | | G09G 3/20 |
| 2021/0248978 A1* | 8/2021 | Kim | | G09G 3/20 |

FOREIGN PATENT DOCUMENTS

| | | |
|---|---|---|
| KR | 10-1845667 B1 | 4/2018 |
| KR | 10-2019-0026128 A | 3/2019 |
| KR | 10-2019-0039534 A | 4/2019 |
| KR | 10-2100768 B1 | 4/2020 |
| KR | 10-2020-0055330 A | 5/2020 |
| KR | 10-2020-0079125 A | 7/2020 |
| KR | 10-2020-0093916 A | 8/2020 |
| KR | 10-2021-0065420 A | 6/2021 |
| KR | 10-2021-0100859 A | 8/2021 |

* cited by examiner (410)

(420)

(430)

(440)

ELECTRONIC DEVICE AND METHOD TO AUTOMATICALLY CONTROL THE BRIGHTNESS OF ELECTRONIC DEVICE

CROSS-REFERENCE TO RELATED APPLICATION(S)

This application is a continuation of International Application No. PCT/KR2022/000278, filed on Jan. 7, 2022, which claims priority to Korean Patent Application No. 10-2021-0004971, filed on Jan. 14, 2021 in the Korean Intellectual Property Office, the disclosures of which are herein incorporated by reference.

TECHNICAL FIELD

One or more embodiments of the instant disclosure generally relate to an electronic device and, more particularly, to a method of controlling brightness of a display of an electronic device.

BACKGROUND

As wireless communication technologies and processor technologies have developed, portable electronic devices (hereinafter, referred to as electronic devices), for example smartphones, may perform various functions beyond being able to call counterparties. For example, the electronic device may execute various applications and provide application screens through a display of the electronic device.

The electronic device may display image data on the display to facilitate execution of a function that a user desires. The user can use the electronic device in various environments, and thus the electronic device may have an automatic brightness control function in order to provide an optimized display use environment in the various environments. For example, in order for the displayed content to be viewed comfortably by the user, the brightness level of the display may increase or decrease based on ambient illuminance.

An electronic device implementing the function of automatically controlling brightness of its display may identify a brightness value mapped to external illuminance based on initially input brightness data and determine brightness of the display according to the identified brightness value. Further, the electronic device may learn appropriate brightness of the display according to use patterns of the user rather than simply controlling the brightness according to the initially input value.

However, the conventional electronic device cannot rapidly learn the appropriate brightness desired by the user and cannot immediately apply the learned brightness values, so that brightness of the display optimized for the use pattern of the user cannot be provided immediately.

SUMMARY

Certain embodiments of the disclosure may provide an efficient learning method when the electronic device is configured to learn the brightness desired by the user as described above. Such an efficient learning method may save time or battery life.

An electronic device according to an embodiment includes a display, a touch sensor configured to receive a user's touch input and generate touch information, an illuminance sensor configured to detect ambient illuminance and generate illuminance information, a memory configured to store brightness data relating the ambient illuminance to brightness of the display, and a processor operatively connected to the display, the illuminance sensor, the touch sensor, and the memory, wherein the processor may be configured to identify the illuminance information from the illuminance sensor, configure the brightness of the display as a first brightness, based on the illuminance information and the brightness data, change the brightness of the display to a second brightness, based on a user input, acquire event information for an operation in which the brightness of the display is changed by the user input, reconfigure the brightness data stored in the memory, based on the event information, and determine the brightness of the display according to a brightness value in the reconfigured brightness data mapped to the illuminance information identified by the illuminance sensor.

A method of controlling brightness by an electronic device according to an embodiment may include identifying illuminance information from an illuminance sensor, configuring brightness of a display as a first brightness, based on the illuminance information and brightness data relating an ambient illuminance of the electronic device to the brightness of the display, changing the brightness of the display to a second brightness, based on a user input, acquiring event information for an operation in which the brightness of the display is changed by the user input, reconfiguring the brightness data stored in a memory, based on the event information, and determining the brightness of the display according to a brightness value in the reconfigured brightness data mapped to the illuminance information identified by the illuminance sensor.

According to certain embodiments, it is possible to provide an electronic device capable of learning display brightness by considering how much time a user maintains specific brightness and a method of controlling brightness by the electronic device.

According to certain embodiments, a high weighted value may be assigned when the user maintains specific brightness for a long time and a low weighted value may be assigned when the user temporarily changes brightness and maintains the brightness for a short time. Thus, the brightness change by the user may be reflected by the calculated weighted value and learning of the use pattern of the user by the electronic device can be made more efficient.

Other effects which can be obtained or predicted from certain embodiments of the disclosure are explicitly or implicitly disclosed in the detailed description of the embodiments of the disclosure. For example, various effects derived from certain embodiments of the disclosure will be disclosed within the detailed description made below.

DETAILED DESCRIPTION

Figure 1:
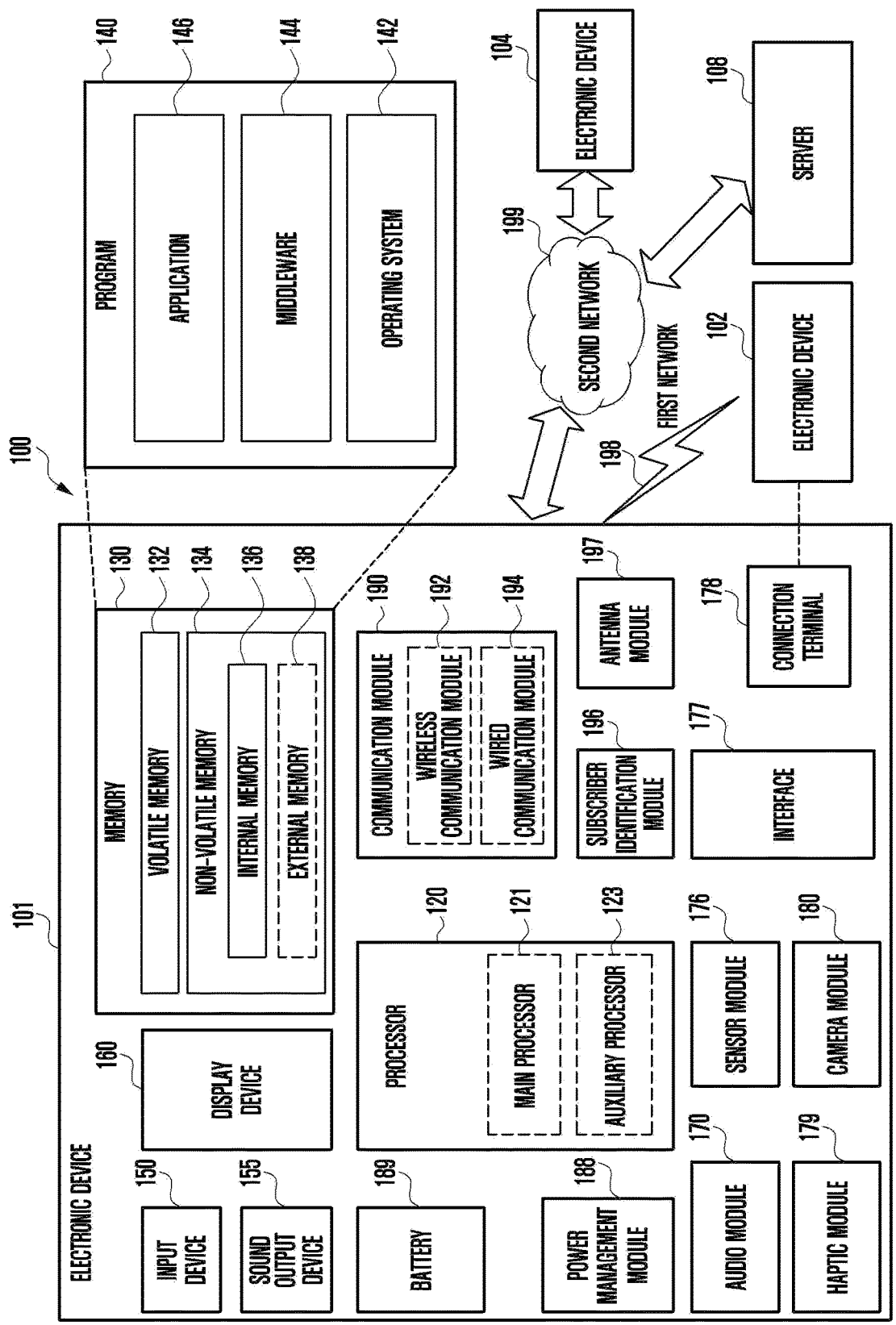
FIG. 1 is a block diagram illustrating an electronic device within a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
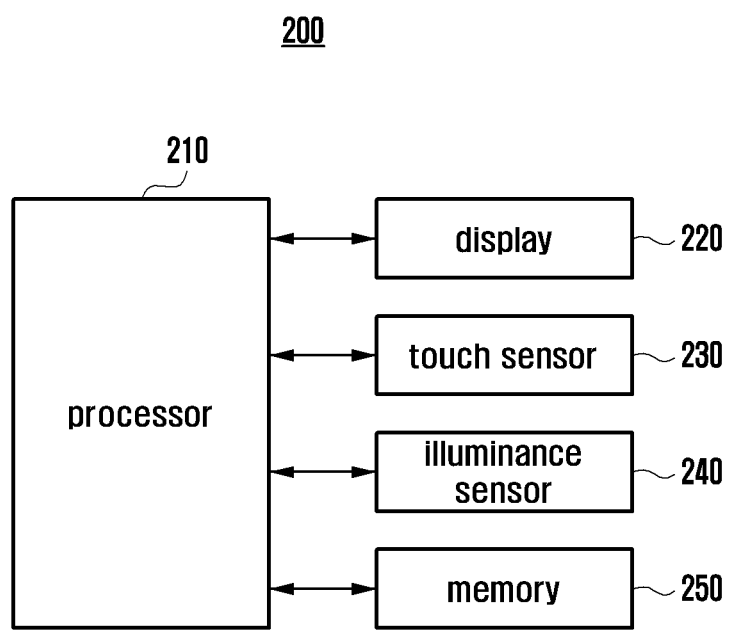
FIG. 2 is a block diagram of an electronic device according to an embodiment.

FIG. 2 is a block diagram of an electronic device according to an embodiment.

Referring to FIG. 2, an electronic device 200 may include a display 220, a touch sensor 230, an illuminance sensor 240, a processor 210, and a memory 250, and some of the illustrated elements may be omitted or replaced in various other embodiments. The electronic device 200 may further include at least some of the elements and/or functions of the electronic device 101 of FIG. 1. At least some of the elements of the electronic device 200 which are (or are not) illustrated may be operatively, functionally, and/or electrically connected to each other.

According to an embodiment, the display 220 may display various images according to the control of the processor 210. The display 220 may be implemented as one of a Liquid Crystal Display (LCD), a Light-Emitting Diode (LED) display, or an Organic Light-Emitting Diode (OLED) display, but is not limited thereto. The display 220 may be configured as a touch screen that detects a touch using a user's body part (for example, finger) or an input device (for example, stylus pen) and/or a proximity touch (or hovering) input. The touch screen may include a touch sensor 230. The display 220 may include at least some of the elements and/or functions of the display module 160 of FIG. 1.

According to an embodiment, at least a portion of the display 220 may be flexible and may be implemented as a foldable display or a rollable display.

According to an embodiment, the touch sensor 230 may include at least some of the elements and/or functions of the sensor module 176 of FIG. 1, and may receive a user input on the display 220. The touch sensor 230 may be implemented as one of a capacitive touch sensor, a resistive touch sensor, a surface touch sensor, a projected captivated (PCAP) touch sensor), and a surface acoustic wave (SAW) touch sensor, but is not limited thereto. The touch screen of the display 220 of the electronic device 200 may include one or more touch sensors 230.

According to an embodiment, the illuminance sensor 240 (for example, the sensor module 176 of FIG. 1) may measure illuminance around the electronic device 200. The illuminance sensor 240 may be disposed in an area in which the housing or the display 220 of the electronic device 200 is removed to allow external light to pass through. The illuminance sensor 240 may be implemented as one of a photo sensor, a cadmium sulfide (CDS) sensor, an ultra violet (UV) sensor, and an ambient light sensor (AIS), but is not limited thereto.

According to an embodiment, the memory 250 may include a volatile memory (for example, the volatile memory 132 of FIG. 1) and a non-volatile memory (for example, the non-volatile memory 134 of FIG. 1) and may temporarily or permanently store various pieces of data. The memory 250 may include at least some of the elements and/or functions of the memory 130 of FIG. 1 and may store the program 140 of FIG. 1.

According to an embodiment, the memory 250 may store various instructions that can be executed by the processor 210. The instructions may include control commands such as arithmetic and logic operations, commands for data movement, input/output, and the like that can be recognized by the processor 210.

According to an embodiment, the memory 250 may store brightness data in which an illuminance value and a display brightness value are mapped. Changed brightness data may be stored in the memory 250 through learning based on default brightness data generated when the electronic device 200 is manufactured and/or a brightness change event of the user.

According to an embodiment, the processor 210 may be operatively, functionally, and/or electrically connected to each element of the electronic device 200, such as the display 220, the touch sensor 230, the illuminance sensor 240, the memory 250, or the like, and may be an element configured to perform calculations or data processing related to the control and/or communication of each element. The processor 210 may include at some of the elements and/or functions of the processor 120 of FIG. 1. The processor 210 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, while the calculation and data processing functions that the processor 210 can perform in the electronic device 200 are not limited by the instant disclosure, various embodiments in which the electronic device 200 learns user change brightness are described hereinafter. Operations of the processor 210 described below may be performed by loading instructions stored in the memory 250.

According to an embodiment, the processor 210 may select an automatic brightness control mode or a manual brightness control mode on the basis of a user input. In the manual brightness control mode, the processor 210 may determine brightness of the display 220 as the user configures the brightness without referring to brightness data stored in the memory 250. In the automatic brightness control mode, the processor 210 may determine brightness of the display 220 by using a user input and/or brightness data stored in the memory 250. According to an embodiment, the processor 210 may provide a UI for selecting the brightness control mode to the display 220.

According to an embodiment, the processor 210 may configure brightness of the display 220 with reference to illuminance information and brightness data received from the illuminance sensor 240 in the automatic brightness control mode. An illuminance value and a brightness value of the display 220 corresponding to the illuminance value may be mapped in the brightness data. The brightness data may be stored in the memory 250. The brightness data may include graph data but there is no limitation in the type of data. For example, an axis of the brightness data (for example, a row in a table or an x axis of a graph) may indicate ambient illuminance of the electronic device 200, and another axis (for example, a column in a table or a y axis of a graph) may indicate screen brightness of the display 220. The processor 210 may identify a current ambient illuminance value of the electronic device 200 through the illuminance sensor 240, discover a brightness value corresponding to the corresponding illuminance value in the brightness data stored in the memory 250, and configure screen brightness by using the corresponding brightness value. For example, when the ambient illuminance of the electronic device 200 is a first illuminance, the processor 210 may control brightness of the display 220 to a first brightness value mapped to a first illuminance value in the brightness data. Thereafter, when the ambient illuminance of the electronic device 200 is changed to second illuminance, the processor 210 may control brightness of the display 220 to a second brightness value mapped to a second illuminance value in the brightness data.

According to an embodiment, when a brightness change event is generated on the basis of a user input, the processor 210 may change brightness of the display 220. According to an embodiment, the processor 210 may provide a brightness control UI (user interface) for allowing the user to control brightness of the screen of the display 220 through the display 220. The brightness control UI may be configured as a bar, and may allow the user to change the brightness of the display 220 from minimum brightness to maximum brightness on the basis of a user input. For example, the user may change brightness of the screen to be bright or dark by touching the brightness control UI and then dragging up and down.

According to an embodiment, when a brightness change event is generated by the user, the processor 210 may generate event information by mapping current illuminance and brightness of the screen changed according to the user input. For example, in the brightness data, when the value mapped to the first illuminance value is a first brightness value, a first event of making a change to a second brightness value by the user through the brightness control UI may be generated. In this case, the processor 210 may generate first event information by mapping the first illuminance value and the second brightness value.

According to an embodiment, the processor 210 may generate event information by further mapping information related to the time at which the brightness change event is generated by the user to the current illuminance and the brightness of the screen changed according to the user input. The time information may include information on the time at which the user changes the brightness and/or an accumulated time during which the changed brightness is used. For example, when the first event is generated at 2 p.m. and a second event is generated at 3 p.m., the first event information may further include the elapsed time until the second event is generated, such as time information indicating that the electronic device used in the second brightness for one hour. The processor 210 may store the generated event information in the memory 250. A number of brightness change events may be accumulated before a brightness data reconfiguration is generated and stored in the memory 250.

According to an embodiment, the processor 210 may generate event information in sections in which illuminance is divided. For example, the processor 210 may measure the brightness use time of the user in units of 50 1x. In this case, the processor 210 may calculate illuminance of 100 1x to 150 1x as one section by the user. The size of each illuminance section may be configured by the user. If the size of the illuminance section is relatively small, the electronic device is more sensitive to illuminance changes, and thus it is possible to more accurately reflect brightness settings by the user.

According to an embodiment, the processor 210 may generate temporary brightness data obtained by reconfiguring the brightness data stored in the memory 250 on the basis of the acquired event information. The temporary brightness data may be brightness data configured when the brightness change event is generated (for example, brightness data changed through learning) in which a brightness value mapped to at least some of the entire illuminance sections is changed.

According to an embodiment, the processor 210 may immediately reflect the brightness change event in the brightness data to generate the temporary brightness data. For example, when the first brightness value is mapped to the first illuminance value in the brightness data and the user generates a brightness change event for changing the brightness of the display 220 to the second brightness, the processor 210 may generate temporary brightness data in which the second brightness value is mapped to the first illuminance value.

According to an embodiment, the processor 210 may control brightness of the screen of the display 220 according to the generated temporary brightness data. For example, the processor 210 may configure brightness of the display 220 to be the brightness value mapped to the illuminance value in the temporary brightness data. When another brightness value is selected on the brightness control UI according to user input, the processor 210 may additionally modify temporary brightness data. The processor 210 may configure brightness of the display 220 to be the brightness value mapped to the current illuminance value with reference to the modified temporary brightness data.

According to an embodiment, when generating temporary brightness data, the processor 210 may also change the brightness value mapped to illuminance within a reference range in illuminance in which the brightness change event is generated. The reference range may vary depending on a level of the brightness change. For example, when the user configures a brightness value in 100 1x as 300 nits, a brightness value in 50 1x to 150 1x may also be changed within 250 nits to 350 nits. By also changing the brightness value mapped to illuminance within the reference range in illuminance in which the brightness change event is generated, a reversal phenomenon in which the illuminance decreases but the brightness increases may be prevented. According to another embodiment, the processor 210 may change brightness values mapped to illuminance values in an entire illuminance section.

According to an embodiment, when a reset condition is satisfied, the processor 210 may reconfigure brightness data. The reset condition may include at least one of a condition in which the display 220 does not operate for a reset time or longer or a condition in which the display 220 operates in illuminance different from the illuminance value last detected by the illuminance sensor 240. The reset time may be configured by default or may vary depending on user settings, and the processor 210 may more rapidly learn the brightness change event if the reset time is set to be relatively short. When it is determined that the display 220 operates in an illuminance environment different from the last illuminance environment, brightness data may not be reconfigured within the same illuminance section in spite of different illuminance values. The processor 210 may store event information on the brightness change event in the memory 250 before the reset condition is satisfied, and may reconfigure the brightness data with reference to the accumulated event information when the reset condition is satisfied.

According to an embodiment, the processor 210 may use accumulated event information to reconfigure brightness data. The processor 210 may reconfigure brightness data in consideration of at least one of used brightness for various illuminances configured by the user, use time, and brightness tendency. The processor 210 may calculate a brightness weighted value by using accumulated event information in order to reconfigure brightness data. The brightness weighted value may include at least one of a time weighted value and a tendency weighted value. The time weighted value may be assigned as a specific (or specific section) brightness value is used longer in a specific illuminance environment. The tendency weighted value may be calculated in consideration of the time spent for changing brightness after the brightness data is reconfigured in the corresponding illuminance and difference between brightness changed by the user before the reconfiguration and brightness changed after the reconfiguration. Detailed calculation of the weighted value is described below with reference to FIG. 6.

According to an embodiment, when there is no touch input of the user for a reference time period, the processor 210 may stop measuring the accumulated use time. Since the screen of the display 220 is not used for the time during which there is no touch input of the user, tendency of the use of brightness may be distorted if the time period during which the display 220 is off is used to calculate the tendency of use of the brightness. The reference time may be configured at a time point at which the electronic device 200 is manufactured and stored in the memory 250 or may vary depending on user settings.

According to an embodiment, the processor 210 may measure the accumulated use time when the display 220 operates and the automatic brightness mode is turned on. In the automatic brightness mode, the processor 210 may automatically control brightness of the display 220 according to brightness data even though the user does not configure brightness of the display 220. In the manual brightness mode, the processor 210 may configure brightness of the display 220 on the basis of user input rather than the brightness data. For example, first brightness mapped to brightness data in a first illuminance environment is not configured as the brightness of the display 220 but second brightness configured by the user may be determined as the brightness of the display 220, and the brightness configured by the user may be maintained regardless of changes in illuminance.

According to an embodiment, the processor 210 may balance-process the brightness data in order to prevent a reversal phenomenon in which a brightness value mapped to a higher illuminance value becomes lower than a brightness value mapped to a lower illuminance value when the brightness data is reconfigured. When the brightness data is reconfigured on the basis of user input, the reversal phenomenon in which brightness increases when illuminance becomes lower in an illuminance section in which brightness is changed by the user or brightness decreases when illuminance increases may occur. In order to prevent the reversal phenomenon, when reconfiguring the brightness data, the processor 210 may perform balance processing based on event information. The processor 210 may prevent the reversal phenomenon by configuring the brightness data through the balance-processing to change brightness according to the brightness change events. According to an embodiment, the processor 210 may balance-process the brightness data by changing a brightness value mapped to an illuminance section adjacent to the illuminance section in which brightness is changed by the user.

Figure 3:
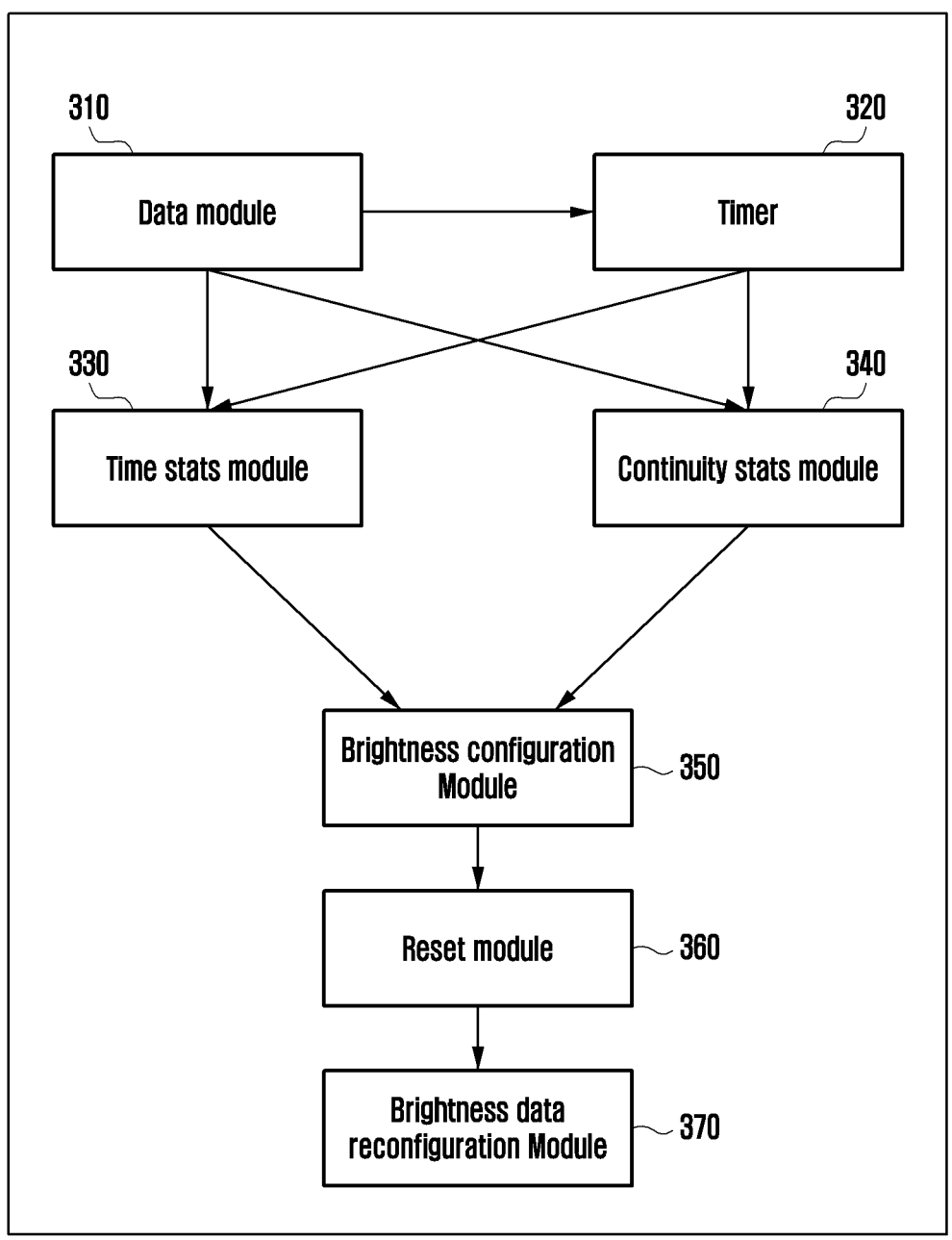
FIG. 3 is a block diagram illustrating a brightness data configuration system of an electronic device according to an embodiment.

FIG. 3 is a block diagram illustrating a brightness data configuration system of an electronic device according to an embodiment.

Referring to FIG. 3, an electronic device 300 may include a data module 310, a timer 320, a time statistics module 330, a tendency (continuity) statistics module 340, a brightness configuration module 350, a reset module 360, and a brightness data reconfiguration module 370. The elements may be operatively connected to each other, and various elements as well as the illustrated elements may be added. The illustrated components (or modules) are software modules and may be implemented by a processor (for example, the processor 210 of FIG. 2) of the electronic device 300.

According to an embodiment, the timer 320 may measure the time during which the user maintains specific brightness while the electronic device 300 is in an active state. The active state may be a state in which a display (for example, the display 220 of FIG. 2) is operating and is configured to be in the automatic brightness mode. According to an embodiment, since the state in which the manual brightness mode is configured is not defined as the active state, the use time in the manual brightness mode may not be used. The processor may measure the use time after switching to the automatic brightness mode on the basis of user input.

According to an embodiment, the timer 320 may receive information on the use of display screen brightness by the user from the data module 310. The timer 320 may measure an accumulated use time for each brightness on the basis of the received information. For example, the timer 320 may receive information on a user touch input among information collected by the data module 310. When the touch input is not received for a reference time or longer, it may be considered that the electronic device 300 is not being used and measurement of the use time may be suspended. Thereafter, when the touch input is received again, it may be considered that the user starts using the electronic device and measurement of the use time may be resumed.

According to an embodiment, the processor may collect at least some of illuminance information and display brightness attributes identified by an illuminance sensor (for example, the illuminance sensor 240 of FIG. 2) and the accumulated use time measured by the timer 320 through the data module 310 and store the same in a memory (for example, the memory 250 of FIG. 2). The display brightness attributes may include at least one of brightness tendency (continuity) for each illuminance section, a brightness use pattern in night mode, a brightness use pattern for each application being executed in the foreground, a brightness use pattern for each color (color temperature), a brightness use pattern according to battery level, and a frequency of user touch inputs when a specific application is being used. For example, when the user frequently uses an application having a white UI, the processor may detect how the user configures display screen brightness for the white UI, generate a brightness use pattern for the color, and transmit information thereon to the data module 310.

According to an embodiment, the processor may transmit information stored in the data module 310 to an element of the electronic device 300 including at least one of the timer 320, the time statistics module 330, and the tendency (continuity) statistics module 340. The calculation performed by at least one element of the electronic device 300 may be performed on the basis of information stored in the data module 310. For example, a time weighted value calculated by the time statistics module 330 may need a level of display brightness and information on a use time in a specific illuminance environment. The processor may collect relevant information and transfer required information to the time statistics module 330 via the data module 310.

According to an embodiment, the time statistics module 330 may collect information on the accumulated use time for each illuminance and calculate the time weighted value. The time weighted value may be determined in proportion to the time period during which the user actually uses the corresponding brightness. For example, as the user uses specific brightness for a longer time period of time, a higher weighted value may be assigned. For example, when the user uses 100 nits for 1 hour and 200 nits for 2 hours in first illuminance surrounding the electronic device, a time weighted value of 100 nits may be calculated as 1 and a time weighted value of 200 nits may be calculated as 2.

According to an embodiment, the time statistics module 330 may receive brightness change event information and information on a brightness use pattern of the user from the data module 310 and the timer 320. The time statistics module 330 may receive information on the accumulated use time for each illuminance measured by the timer 320 and calculate a time weighted value on the basis thereof.

According to an embodiment, the continuity statistics module 340 may collect information on the brightness use pattern of the user and calculate a continuity weighted value. The continuity weighted value may be a value obtained by analyzing a brightness use pattern of the user in specific illuminance. For example, preference of the user to use high brightness of the display in a low illuminance environment may be reflected in calculations of the continuity weighted value, and thus a high continuity weighted value may be assigned to maintenance of high screen brightness in the low illuminance environment.

According to an embodiment, the processor may calculate a brightness weighted value according to [Equation 1] below.

$$W_n = f(T_n, C_n) = T_n + C_n \quad \text{[Equation 1]}$$

$W_n$: Brightness weighted value
$T_n$: Time weighted value
$C_n$: Continuity weighted value According to an embodiment, the brightness weighted value may be calculated by adding the time weighted value ($T_n$) and the continuity weighted value ($C_n$). For example, when the use time is 10 hours and the event continuity value is 30, the brightness weighted value may be calculated as 40. The brightness weighted value may determine how much the corresponding brightness value should be reflected in the reconfiguration of the brightness data.

$$B_{learned} = \frac{B_1 W_1 + B_2 W_2 + \ldots + B_n W_n}{W_1 + W_2 + \ldots + W_n} \quad \text{[Equation 2]}$$

According to an embodiment, the processor may reconfigure brightness data according to [Equation 2] above. $B_1$, $B_2$, etc. are the different brightnesses used for a particular illuminance and $W_1$, $W_2$, etc. are the corresponding brightness weighted values. Information on the brightness change event may be stored in a memory (for example, the memory 250 of FIG. 2), and the processor may calculate the brightness weighted value using the information and reconfigure brightness data.

According to an embodiment, the time statistics module 330 and the continuity statistics module 340 may transmit the collected information on the accumulated use time for various illuminances, user brightness use pattern, and calculated brightness weighted value to the brightness configuration module 350.

According to an embodiment, when the user changes brightness to a value other than the value mapped in the brightness data for a specific illuminance, the processor may generate temporary brightness data in the brightness configuration module 350. The brightness configuration module 350 may generate temporary brightness data on the basis of the event information and the brightness weighted value received from the time statistics module 330 and the continuity statistics module 340. Before brightness data is reconfigured after a reset condition is satisfied, the processor may change display brightness according to the temporary brightness data generated by the brightness configuration module 350. For example, the processor may receive information on the current illuminance value from an illuminance sensor (for example, the illuminance sensor 240 of FIG. 2) and determine a brightness value mapped to the corresponding illuminance value in the temporary brightness data generated by the brightness configuration module 350 as the display screen brightness. The brightness configuration module 350 may change the temporary brightness data whenever a user input is received. Since a plurality of user inputs may be received even before brightness data is reconfigured, the temporary brightness data may be continuously changed. According to an embodiment, when generating temporary brightness data, the brightness configuration module 350 may also change brightness mapped to an illuminance section adjacent to an illuminance section in which brightness is changed by a user input.

According to an embodiment, the reset module 360 may determine whether the reset condition is satisfied. The reset module 360 may receive at least one piece of information on illuminance around the electronic device 300 and information indicating whether the display operates from the data module 310. When the reset condition is satisfied, the reset module 360 may determine that the reset condition is satisfied and the brightness data reconfiguration module 370 may support the reset of brightness data.

According to an embodiment, the brightness data reconfiguration module 370 may reconfigure brightness data in consideration of all event information when the brightness configuration module 350 reflects in the temporary brightness data, the time weighted value, and the continuity weighted value. According to an embodiment, when reconfiguring brightens data, the brightness data reconfiguration module 370 may also change brightness mapped to an illuminance section adjacent to an illuminance section in which brightness is changed by a user input. When the reset module 360 determines that the reset condition is satisfied, the brightness data reconfiguration module 370 may reconfigure the brightness data. When reconfiguring the brightness data, the brightness data reconfiguration module 370 may initialize the temporary brightness data.

According to an embodiment, the brightness data reconfiguration module 370 may process balancing while reconfiguring the brightness data. When brightness is changed only in an illuminance section in which the brightness change event is generated, a reversal phenomenon may occur, and thus the brightness data reconfiguration module 370 may process balancing in order to prevent the reversal phenomenon. For example, a brightness value mapped to an illuminance section adjacent to the illuminance section in which the brightness change event is generated.

Figure 4:
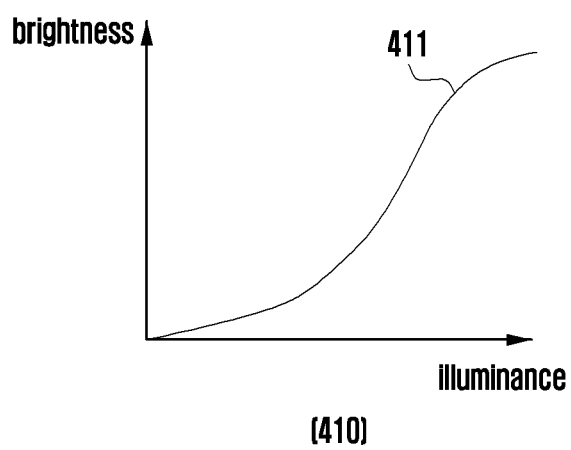
FIG. 4 is graphs illustrating weighted value scenarios based on an accumulated use time of an electronic device according to an embodiment.
Figure 4:
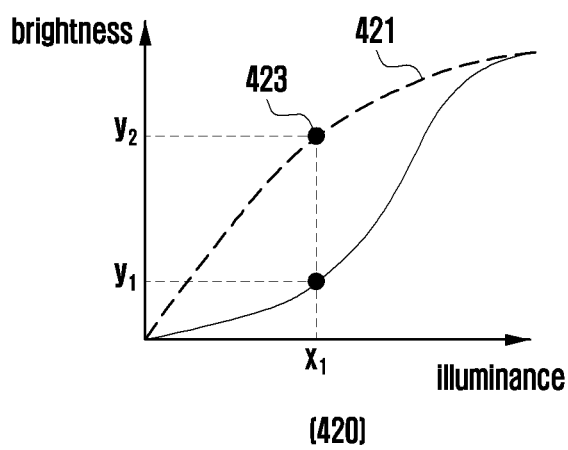
Figure 4:
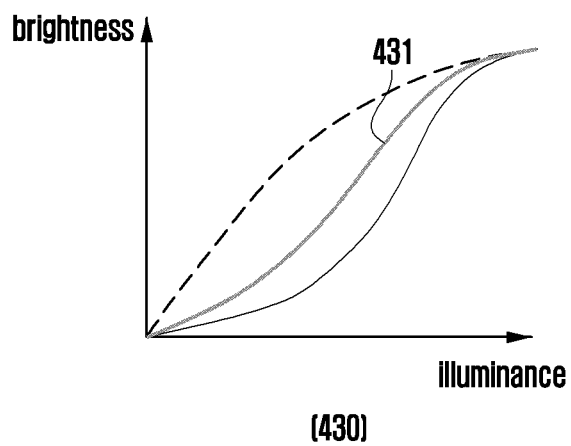
Figure 4:
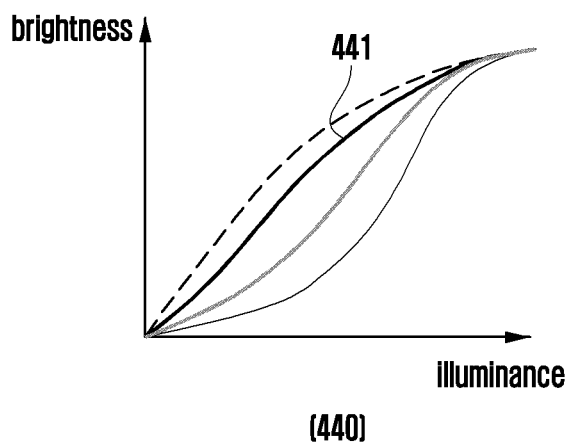

FIG. 4 is graphs illustrating weighted value scenarios based on accumulated use times of an electronic device according to an embodiment.

FIG. 4 illustrates brightness in graph form by way of example for convenience of description according to an embodiment, but the brightness data is not limited thereto. For example, brightness data may include table data, and visualized table data may have the form illustrated in FIG. 4.

Referring to FIG. 4, a processor (for example, the processor 210 of FIG. 2) may reconfigure brightness data on the basis of the brightness accumulated use time of the user. Default brightness data stored in a memory (for example, the memory 250 of FIG. 2) may be configured as shown in a graph 410. According to an embodiment, default brightness data 411 may be stored in the memory during the manufacture of the electronic device. As shown, brightness increases as illuminance increases, and the processor may acquire illuminance information from an illuminance sensor (for example, the illuminance sensor 240 of FIG. 2) and determine brightness of the display (for example, the display 220 of FIG. 2) based on the brightness value mapped to the value of illuminance around the electronic device in the brightness data.

According to an embodiment, the processor may change display brightness on the basis of user input. The default brightness data and temporary brightness data 421 generated by user input may be configured as shown in a graph 420. When the user changes brightness from $y_1$ to $y_2$ in an environment in which illuminance is $x_1$ 423, the processor may generate the temporary brightness data 421 in which the corresponding user input is reflected. The processor may process balancing by changing not only brightness mapped to illuminance $x_1$ in which a user touch is input but also a brightness value mapped to an adjacent illuminance section. The processor may determine display brightness according a brightness value mapped to the generated temporary brightness data 421 until the brightness data is reset when a reset condition is satisfied. For example, the processor may determine display brightness as $y_2$ in an environment in which illuminance is $x_1$ 423 after the brightness change event is generated.

According to an embodiment, the processor may reconfigure brightness data when the reset condition is satisfied. The processor may reconfigure brightness data in consideration of at least one of the brightness accumulated use time of the user and a difference between brightness changed before reconfiguration and brightness changed after reconfiguration. The graph 430 shows the default brightness data 411 and the temporary brightness data 421 before reconfiguration, and brightness data 431 after reconfiguration. The reconfigured brightness data 431 may be configured to be between the temporary brightness data 421 and the default brightness data 411.

For example, when the electronic device is used for 1 hour, a first event of changing display brightness of 200 nits in an environment in which illuminance is 300 1× in the default brightness data 411 to 250 nits may be generated. Thereafter, in the brightness data 431 reconfigured when the reset condition is satisfied, display brightness may be determined between 200 nits and 250 nits in the environment in which illuminance is 300 1×.

According to an embodiment, the processor may calculate a time weighted value and a continuity weighted value and reconfigure brightness data on the basis thereof. The graph 440 shows reconfigured brightness data 441 when the use time at the user-specified brightness changes. The processor may reconfigure brightness data in consideration of the use time in the corresponding brightness. For example, as the use time is longer in a specific brightness value, brightness data may be reconfigured with a higher weighted value. For example, when the first event is generated for 5 hours, the processor may reconfigure brightness data to be closer to the temporary brightness data 421 than illustrated in the graph 430.

For example, there may be a use case in which the user uses the electronic device for 1 hour with brightness of 180 nits in illuminance of 500 1× according to the default brightness data, moves to illuminance of 0 1× and uses it for 0.1 hours with brightness of 10 nits according to the default brightness data, changes display brightness to 100 nits in the same illuminance and uses it for 1 hour, and finally the user may move to illuminance of 500 1× and use the electronic device for 2 hours with brightness of 180 nits according to the default brightness data. Thereafter, when the reset condition is satisfied, the processor may process learning for illuminance sections of 0 1× and 500 1×. This may be shown in the following table.

TABLE 1

| Ambient illuminance (lux) | Screen brightness (nit) | Accumulated use time (h) | Note |
|---|---|---|---|
| 500 | 180 | 1 | Apply default brightness data |
| 0 | 10 | 0.1 | Move to environment in which ambient illuminance is 0 lux |
| 0 | 100 | 1 | User changes brightness (10 →100) |
| 500 | 180 | 2 | Move to environment in which ambient illuminance is 500 lux Reset condition is satisfied and thus brightness data is reconfigured |

$$B_{learned} = \frac{10 \times 0.1 + 100 \times 1}{0.1 + 1} = 91.9 nit \quad \text{[Equation 3]}$$

Only one brightness (180 nits) is used in the section of 500 1x, and thus brightness learning may not be performed for that illuminance section. Instead, the brightness weighted value may be calculated in the section of 0 1x, which may be the time weighted value and calculated as shown in [Equation 3], holding the continuity weighted value to be 0. The processor may configure brightness in 0 1x as 91.9 rather than 10 after reconfiguring brightness data. The processor may additionally control brightness values in illuminance higher than or equal to 0 1x to prevent reversal phenomenon. For example, the processor may control all brightness values mapped to an illuminance section higher than or equal to 0 1x to be larger than or equal to 91.9 nits.

Figure 5:
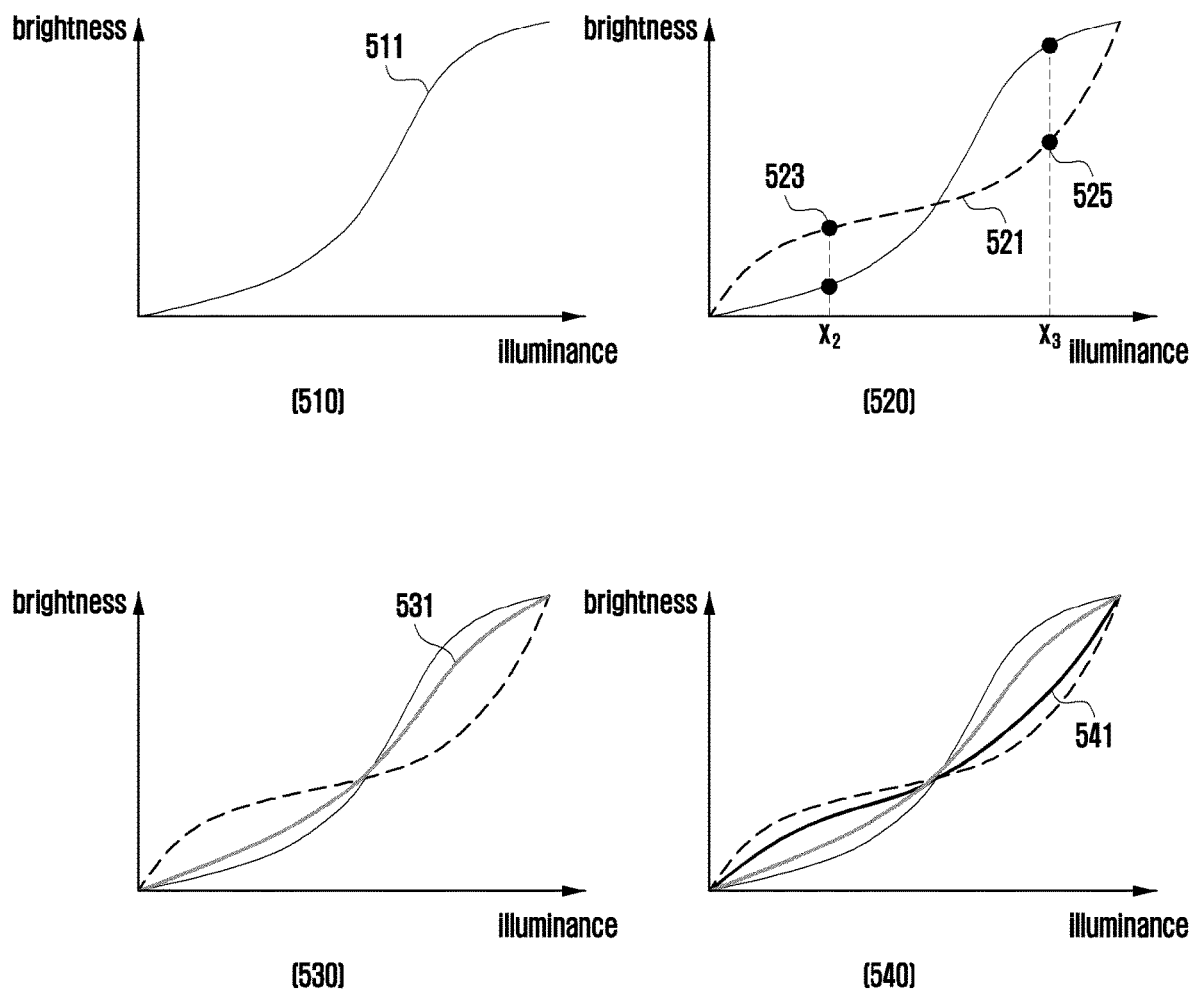
FIG. 5 is graphs illustrating brightness configuration continuity weighted value scenarios of an electronic device according to an embodiment.

FIG. 5 is graphs illustrating brightness configuration continuity weighted value scenarios of an electronic device according to an embodiment.

FIG. 5 illustrates brightness in a graph form by way of example for convenience of description according to an embodiment, but the brightness data is not limited thereto. For example, brightness data may include table data, and visualized table data may have the form illustrated in FIG. 5.

Referring to FIG. 5, a processor (for example, the processor 210 of FIG. 2) may reconfigure brightness data on the basis of brightness configuration continuity of the user. Default brightness data stored in a memory (for example, the memory 250 of FIG. 2) may be configured as shown in a graph 510. According to an embodiment, default brightness data 511 may be stored in the memory during the manufacture of the electronic device. Brightness increases as illuminance increases, and the processor may acquire illuminance information from an illuminance sensor (for example, the illuminance sensor 240 of FIG. 2) and determine brightness of a display (for example, the display 220 of FIG. 2) based on the brightness value mapped to an illuminance value around the electronic device in brightness data 511.

According to an embodiment, the processor may change display brightness on the basis of user input. The brightness data and temporary brightness data 521 generated by user input may be configured as shown in a graph 520. When the user changes brightness in an environment in which illuminance is $x_2$ 523 and $x_3$ 525, the processor may generate temporary brightness data 521 corresponding to the user inputs. The processor may also change brightness values mapped to an illuminance section adjacent to the sections in which illuminance values are $x_2$ 523 and $x_3$ 525 in order to prevent the reversal phenomenon.

According to an embodiment, when the reset condition is satisfied, the processor may reconfigure brightness data. The graph 530 shows the default brightness data 511 and the temporary brightness data 521 before reconfiguration, and brightness data 531 after reconfiguration. The reconfigured brightness data 531 may be located between the default brightness data 511 and the temporary brightness data 521 before reconfiguration. The processor may differently configure brightness data in consideration of the continuity weighted value. If the user more frequently uses the electronic device in changed brightness than the brightness value mapped to the default brightness data 511, brightness data may be reconfigured to be closer to the temporary brightness data 521. For example, when the user has a tendency of more frequently using brightness higher than the default brightness value in an environment in which illuminance is low and more frequently using brightness lower than the default brightness value in an environment in which illuminance is high, the processor may map a higher brightness value in the section including the illuminance value $x_2$ and map a lower brightness value in the section including the illuminance value $x_3$ when reconfiguring brightness data. According to an embodiment, the processor may track the use pattern of the user and continuously calculate the continuity weighted value to reflect the user pattern. For example, if the user's tendency of more frequently using high brightness in low illuminance and using low brightness in high illuminance increases, brightness may be reconfigured to be closer to the temporary brightness data 521 as illustrated in the graph 540, specifically the brightness data 541, rather than the default brightness data 511 before reconfiguration.

According to an embodiment, when reconfiguring brightness data, the processor may process balancing by also changing brightness values mapped to illuminance sections adjacent to the illuminance section in which the user changes brightness.

For example, there may be a first use case in which the user uses the electronic device for 50 hours with brightness of 91.9 nits according to the default brightness data in illuminance of 0 1x and changes display brightness to 180 nits in the same illuminance and uses it for one hour. Thereafter, when the reset condition is satisfied, the processor may process learning for the section of 0 1x. Thereafter, there may be a second use case in which display brightness is changed from 93.6 nits to 180 nits in the same illuminance, and the reset condition is satisfied and thus the processor may process learning for the section of 0 1x again. This may be shown in the following table.

TABLE 2

| Ambient illuminance (lux) | Screen brightness (nit) | Accumulated use time (h) | Note |
|---|---|---|---|
| 0 | 91.9 | 50 | Brightness data reconfigured after use for 1 month |
| 0 | 180 | 1 | User changes brightness (91.9 →180) Reset condition is satisfied and thus brightness data is reconfigured |
| 0 | 180 | 1 | User changes brightness (93.6 →180) Reset condition is satisfied and thus brightness data is reconfigured |

$$B_1 = 91.9nit, W_1 = 50(T_1 = 50, C_1 = 0) \quad \text{[Equation 4]}$$

$$B_2 = 180nit, W_2 = 1(T_2 = 1, C_2 = 0) \quad \text{[Equation 5]}$$

$$B_{learned} = \frac{91.9 \times 50 + 180 \times 1}{50 + 1} = 93.6nit \quad \text{[Equation 6]}$$

[Equation 4] to [Equation 6] are for the first learning process in the section of 0 1x. The processor may reconfigure the brightness data according to event information after 1 month of use by the user. When the user uses the electronic device for 50 hours with 91.9 nits in 0 1x, changes 91.9 nits to 180 nits, and uses it for 1 hour, and then brightness data is reconfigured, [Equation 6] above may be established holding the continuity weighted values ($C_1$, $C_2$) to 0. The reconfigured brightness data may map illuminance of 0 1x and brightness of 93.6 nits. Thereafter, the processor may determine display brightness as 93.6 nits in an illuminance environment of 0 1x.

$$B_1 = 93.6nit, W_1 = 51(T_1 = 51, C_1 = 0) \qquad \text{[Equation 7]}$$

$$B_2 = 180nit, W_2 = 101(T_2 = 1, C_2 = 100) \qquad \text{[Equation 8]}$$

$$B_{learned} = \frac{93.6 \times 51 + 180 \times 101}{51 + 101} = 151 nit \qquad \text{[Equation 9]}$$

[Equation 7] to [Equation 9] are for the second learning process in the section of 0 1×. The processor may store the previously reconfigured brightness data in the memory and use the data. When the user changes brightness to 180 nits in 0 1× and uses the electronic device for 1 hour, and then the reset condition is satisfied and thus brightness data is reconfigured, the processor may perform calculation as shown in [Equation 9] above. In [Equation 8], the continuity weighted value of the second event in which the user changes brightness from 93.6 nits to 180 nits, for example, $C_2$ is configured as 100, which may be calculated based on the difference between brightness changed by the user before reconfiguration and the brightness change after reconfiguration and/or the time period between brightness data reconfiguration. Thereafter, the processor may determine display brightness to 151 nits in an environment of 0 1×.

Figure 6:
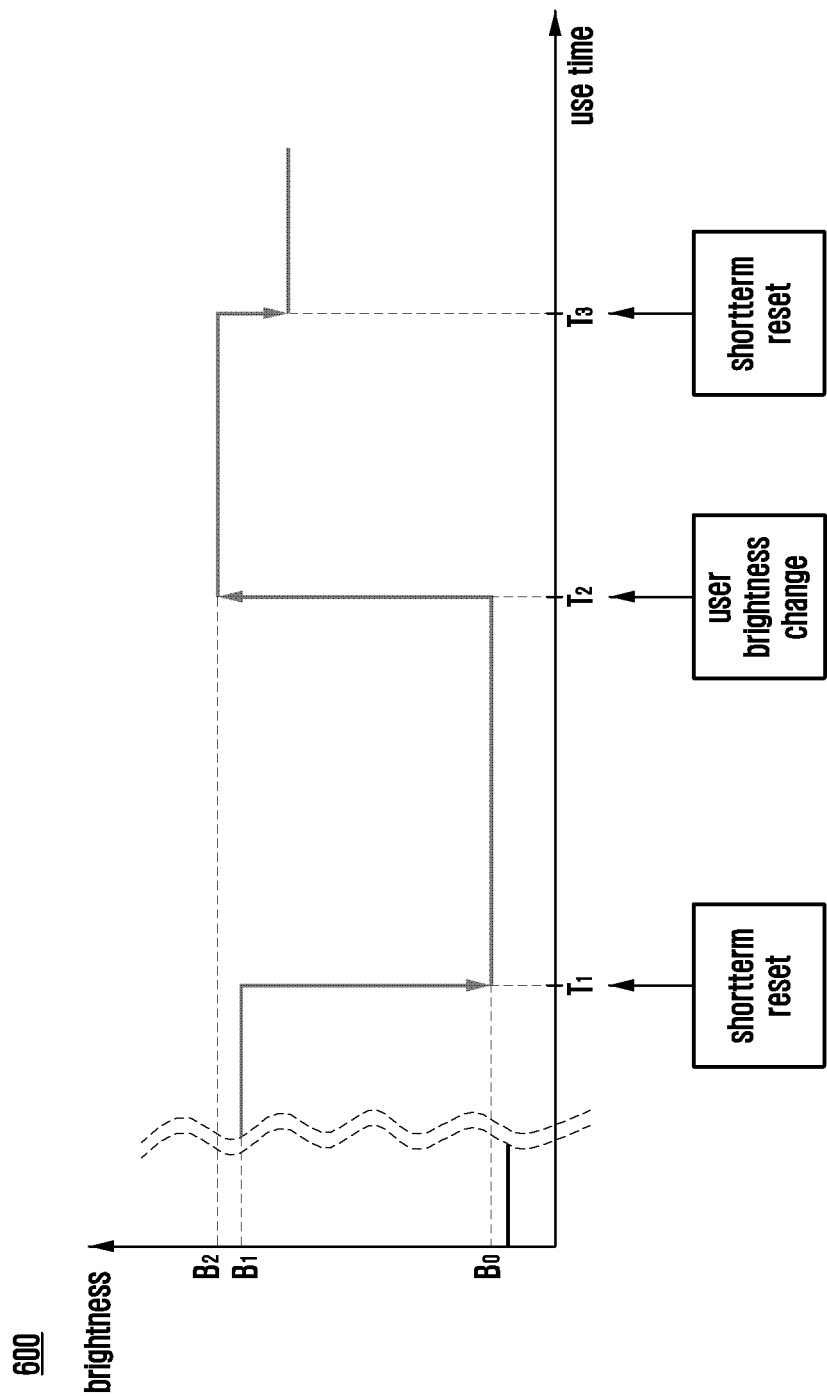
FIG. 6 is a graph illustrating a scenario of the use time for each brightness to calculate a continuity weighted value of an electronic device according to an embodiment.

FIG. 6 is a graph illustrating a scenario of the use time for each brightness to calculate a continuity weighted value of an electronic device according to an embodiment.

According to an embodiment, a processor (for example, the processor 210 of FIG. 2) may calculate a continuity weighted value for reconfiguring brightness data. The processor may calculate the continuity weighted value in consideration of at least one of brightness configuration by the user, use time, brightness configuration according to battery level, brightness configuration according to an application being executed in the foreground or background, brightness configuration according to a color for a displayed UI, and brightness configuration when night mode is executed, or one of combinations of two or more thereof, but the disclosure is not limited thereto.

According to an embodiment, when calculating the continuity weighted value for the brightness configuration, the processor may calculate it by taking into account the difference between changed brightness before reconfiguration and changed brightness after reconfiguration and/or the time spent until the user changes brightness again after the brightness data reconfiguration. FIG. 6 illustrates the case 600 in which brightness data is reconfigured after the brightness change by the user. When ambient illuminance of the electronic device is a first illuminance, the processor may configure brightness of the display (for example, the display 220 of FIG. 2) as $B_0$ according to a value mapped to first, i.e. default, brightness data. Thereafter, when the user changes brightness to $B_1$, the processor may generate temporary brightness data and change the brightness value in first illuminance to $B_1$. Subsequently, when the reset condition is satisfied at $T_1$, brightness data may be reconfigured. When the brightness data is reconfigured, the user has changed brightness from $B_0$ to $B_1$, and thus a value higher than $B_0$ that is the value mapped to the first illuminance in the brightness data before the reconfiguration. When the user changes brightness to $B_2$ again at $T_2$ and brightness data is reconfigured at $T_3$, the reconfigured brightness data may be configured such that the value mapped to the first illuminance is closer to $B_1$ rather than $B_0$.

According to an embodiment, the processor may calculate the continuity weighted value by taking into account the difference between the brightness ($B_1$) that the user changes before the brightness data reconfiguration and the brightness ($B_2$) that the user changes after the reconfiguration. As the difference between $B_1$ and $B_2$ is small, it is determined that the user is more likely to use one of these brightnesses, and a higher continuity weighted value may be assigned. On the other hand, when the difference between $B_1$ and $B_2$ is large, it is determined that the user is not likely to use either $B_1$ and $B_2$ consistently, and a lower continuity weighted value may be assigned. According to an embodiment, when the difference ($B_{threshold}$) between $B_1$ and $B_2$ is larger than or equal to a predetermined value, the processor may calculate the continuity weighted value as 0.

According to an embodiment, the processor may calculate the continuity weighted value in consideration of the time period between a time point ($T_1$) at which brightness data is reconfigured and a time point ($T_2$) at which a brightness change event by the user is generated. As an interval between $T_1$ and $T_2$ is shorter, it is determined that the user is more likely to prefer the corresponding brightness and a higher continuity weighted value may be assigned. On the other hand, as the interval between $T_1$ and $T_2$ is longer, it is determined that the user is not likely to use the corresponding brightness and a lower continuity weighted value may be assigned According to an embodiment, when the interval ($T_{threshold}$) between $T_1$ and $T_2$ is larger than or equal to a predetermined value, the processor may calculate the continuity weighted value as 0.

An electronic device (for example, the electronic device 101, the electronic device 200, or the electronic device 300) according to an embodiment includes a display (for example, the display module 160 or the display 220), a touch sensor (for example, the touch sensor 230) configured to receive a user's touch input and generate touch information, an illuminance sensor (for example, the illuminance sensor 240) configured to detect ambient illuminance and generate illuminance information, a memory (for example, the memory 130 or the memory 250) configured to store brightness data relating the ambient illuminance to brightness of the display, and a processor (for example, the processor 120 or the processor 210) operatively connected to the display, the illuminance sensor, the touch sensor, and the memory, wherein the processor may be configured to identify the illuminance information from the illuminance sensor, configure the brightness of the display as a first brightness, based on the illuminance information and the brightness data, change the brightness of the display to a second brightness, based on a user input, acquire event information for an operation in which the brightness of the display is changed by the user input, reconfigure the brightness data stored in the memory, based on the event information, and determine the brightness of the display according to a brightness value mapped in the reconfigured brightness data to the illuminance information identified by the illuminance sensor.

According to an embodiment, the processor may be configured to, when the brightness of the display is changed to the second brightness, based on the user input, generate temporary brightness data, based on the second brightness and determine the brightness of the display according to a brightness value mapped to the illuminance information in the temporary brightness data before the brightness data is reconfigured.

According to an embodiment, the processor may be configured to, when generating the temporary brightness data, change brightness values mapped to illuminance values within a reference range of the illuminance information identified by the illuminance sensor.

According to an embodiment, the processor may be configured to calculate a time weighted value and a continuity weighted value, based on the event information and reconfigure the brightness data further using the calculated time weighted value and continuity weighted value.

According to an embodiment, the processor may be configured to calculate the continuity weighted value based on a time spent until the brightness of the display is changed again after the brightness data is reconfigured and a difference between brightness changed by the user before the reconfiguration and brightness changed after the reconfiguration.

According to an embodiment, the processor may be configured to reconfigure the brightness data when the display is not operated for longer than a predetermined reset time period or the display operates in an illuminance different from an illuminance corresponding to the illuminance information identified by the illuminance sensor.

According to an embodiment, the processor may be configured to, when reconfiguring the brightness data, change brightness values mapped to illuminance values within a reference range of the illuminance information identified by the illuminance sensor.

According to an embodiment, the processor may be configured to identify touch information from the touch sensor and, when a time period for which there is no received touch input is longer than or equal to a reference time period, exclude the time period from calculations of an accumulated use time used in calculating a time weighted value.

According to an embodiment, the illuminance sensor may be configured to measure illuminance in sections divided at predetermined intervals.

According to an embodiment, the processor may be configured to acquire the event information when the display is operating, the user input is detected by the touch sensor, and an automatic brightness mode is configured.

Figure 7:
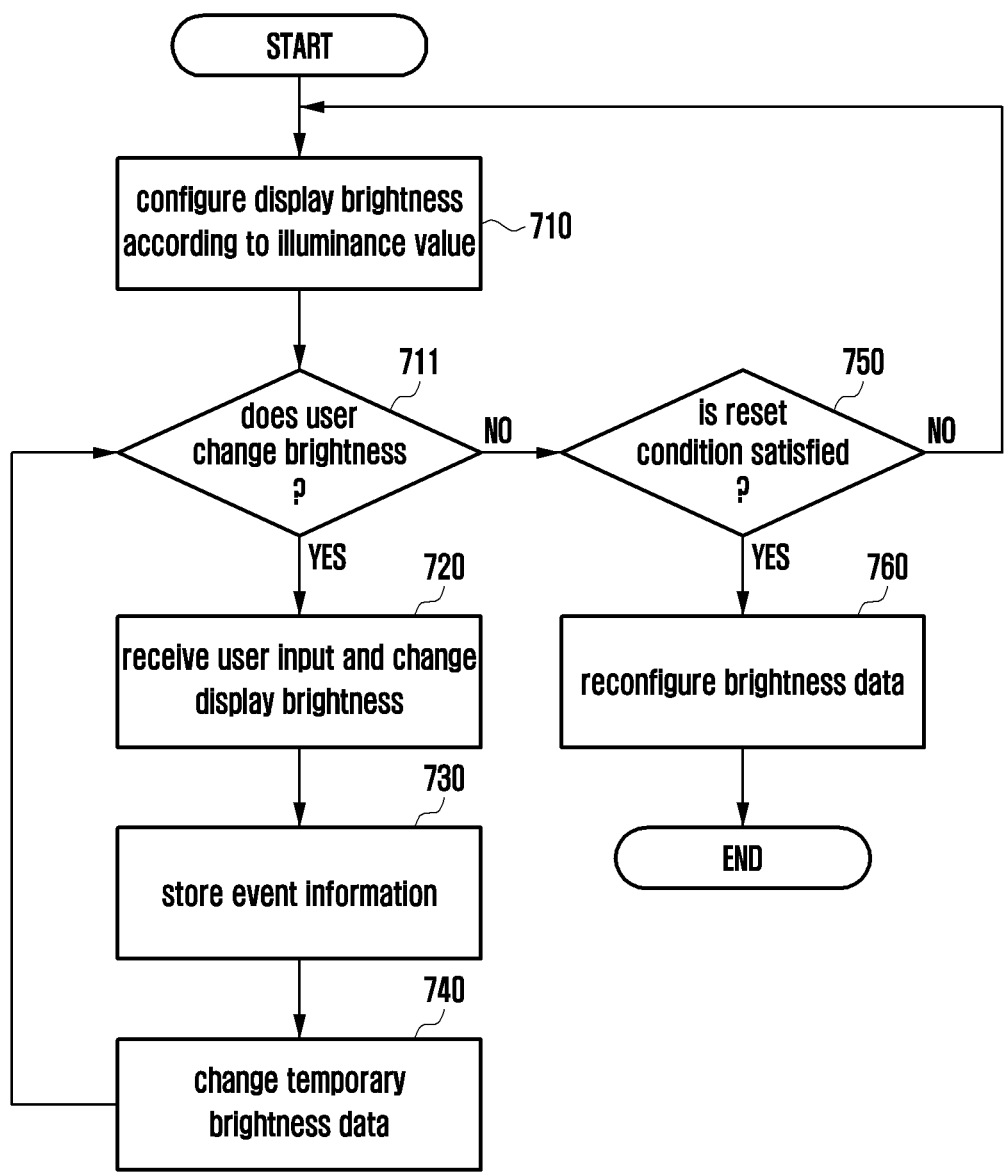
FIG. 7 is a flowchart illustrating an automatic brightness learning method of an electronic device according to an embodiment.

FIG. 7 is a flowchart illustrating an automatic brightness learning method of an electronic device according to an embodiment.

The illustrated method may be performed by at least one element (for example, the processor 120 of FIG. 1 or the processor 210 of FIG. 2) included in the electronic device (for example, the electronic device 101 of FIG. 1, the electronic device 200 of FIG. 2, or the electronic device 300 of FIG. 3), and a description of the technical features that have been described above may be omitted hereinafter.

According to an embodiment, in operation 710, the electronic device may configure brightness of a display (for example, the display 220 of FIG. 2) with reference to illuminance information and brightness data identified by an illuminance sensor (for example, the illuminance sensor 240 of FIG. 2). An illuminance value and a display brightness value in the corresponding illuminance value may be mapped in the brightness data. For example, when the brightness data is implemented as a graph, the x axis of the graph may indicate ambient illuminance of the electronic device and the y axis may indicate display screen brightness. The electronic device may receive information indicating the current ambient illuminance value of the electronic device from the illuminance sensor, discover a brightness value corresponding to the corresponding illuminance value in the brightness data stored in a memory (for example, the memory 250 of FIG. 2), and configure the brightness value as the corresponding brightness value. For example, when ambient illuminance of the electronic device is a first illuminance, the electronic device may control display brightness to be the first brightness value mapped to the first illuminance value in the brightness data. Thereafter, when the ambient illuminance of the electronic device is changed to second illuminance, the electronic device may control display brightness to a second brightness value mapped to a second illuminance value in the brightness data.

According to an embodiment, in operation 711, the electronic device may receive an input for changing brightness by the user. The processor may control display brightness according to a user input.

According to an embodiment, when a brightness change event is generated on the basis of the user input, the electronic device may change display brightness in operation 720. According to an embodiment, the electronic device may provide a brightness control UI for allowing the user to control brightness of a display screen. The brightness control UI may be configured as a bar element in a UI, and may change brightness of the display from minimum brightness to maximum brightness on the basis of user input. For example, the user may change brightness of the screen to be bright or dark by touching the brightness control UI and then dragging up and down.

According to an embodiment, the electronic device may map illuminance in which the brightness change event is generated by the user and changed screen brightness to generate event information in operation 730. For example, in the brightness data, the value mapped to the first illuminance value is a first brightness value, and a first event of making a change to a second brightness value by the user through the brightness control UI may be generated. In this case, the electronic device may map the first illuminance value and the second brightness value to generate first event information. According to an embodiment, the electronic device may further map information on the time at which the brightness change event is generated by the user to generate event information. The time information may include information on the time at which the user changes brightness and/or an accumulated time for which the changed brightness is used. The electronic device may store generated event information in the memory. The brightness change event may be accumulated before a brightness data reconfiguration (graph reconfiguration) is generated and stored in the memory.

According to an embodiment, the electronic device may generate event information for various illuminance sections. The length of each illuminance section may be configured to be long or short according to the user. As the length of the illuminance section is shorter, the electronic device is more sensitive to an illuminance change, it is possible to more accurately reflect brightness settings by the user.

According to an embodiment, the electronic device may generate temporary brightness data obtained by reconfiguring the brightness data stored in the memory on the basis of the acquired event information in operation 740. The electronic device may immediately reflect the brightness change event in the brightness data to generate temporary brightness data. The electronic device may control display screen brightness according to the generated temporary brightness data. For example, the display brightness may be configured as a brightness value mapped to an illuminance value in the temporary brightness data. The electronic device may continuously modify temporary brightness data according to a user input on the basis of the brightness data. The electronic device may configure display brightness as a brightness value mapped to the current illuminance value with reference to the modified temporary brightness data.

According to an embodiment, when generating temporary brightness data, the electronic device may also change the brightness value mapped to illuminance within a reference range in illuminance in which the brightness change event is generated. The reference range may vary depending on a level of the change in brightness. By also changing the brightness value mapped to illuminance within the reference range in illuminance in which the brightness change event is generated, reversal phenomenon in which the illuminance decreases but the brightness increases may be prevented.

According to an embodiment, in operation 750, the electronic device may determine whether the reset condition is satisfied. When the reset condition is satisfied ("Yes" of operation 750), the electronic device may reconfigure brightness data. The reset condition may include at least one of non-operation of the display for a reset time period or longer and operation of the display in illuminance different from an illuminance value detected by the illuminance sensor when the display operates last. The reset time period may vary depending on user settings, and the electronic device may rapidly learn the brightness change event to reconfigure the brightness data if the reset time period is set to be relatively short (e.g. 1 day). When it is determined whether the display operates in an illuminance environment different from the illuminance environment in the last operation, the data reconfiguration may not be generated if the illuminance value is different but the new illuminance is still in the same illuminance section. The electronic device may store the event information for the brightness change event in the memory before the reset condition is satisfied (for example, "No" of operation 750), and when the reset condition is satisfied, may reconfigure brightness data with reference to accumulated event information.

According to an embodiment, in operation 760, the electronic device may use the accumulated event information to reconfigure the brightness data. The electronic device may reconfigure the brightness data in consideration of at least one of used brightness for various illuminances by the user, a use time, and brightness continuity. The electronic device may calculate the brightness weighted value by using the accumulated event information in order to reconfigure the brightness data. The brightness weighted value may include at least one of a time weighted value and a tendency weighted value. The time weighted value may be assigned based on when a specific brightness value is used for a specific period of time in a specific illuminance environment. The continuity weighted value may be calculated in consideration of the time spent for changing brightness after the brightness data is reconfigured in the corresponding illuminance and difference between brightness changed by the user before the reconfiguration and brightness changed after the reconfiguration.

According to an embodiment, the electronic device may suspend measurement of the accumulated use time when there is no user's touch input for a reference time period. Since the display screen is not used for the time during which there is no user's touch input, continuity of the use of brightness may be distorted if the time period during which the display is off is used to calculate the continuity of use. Reference time may vary depending on user settings.

According to an embodiment, the electronic device may measure the accumulated use time when the display operates and the automatic brightness mode is turned on. Even through the user does not configure display brightness, the electronic device may automatically control display brightness according to brightness data in the automatic brightness mode. The electronic device may configure display brightness on the basis of a user input rather than brightness data in the manual brightness mode.

According to an embodiment, the electronic device may process balancing when brightness data is reconfigured. When the brightness data is reconfigured on the basis of a user input, the reversal phenomenon in which brightness increases when illuminance becomes lower than that in an illuminance section in which brightness is changed by the user or brightness decreases when illuminance increases occur. When reconfiguring brightness data, the electronic device may perform a balancing process in consideration of event information in order to prevent the reversal phenomenon. When the brightness data is configured to increase brightness as illuminance increases, the reversal phenomenon may be prevented. According to an embodiment, the electronic device may process balancing by also changing a brightness value mapped to an illuminance section adjacent to the illuminance section in which the user changes brightness.

The electronic device may include at least one of a data module, a timer, a time statistics module, a continuity statistics module, a brightness configuration module, a reset module, and a brightness data reconfiguration module, and the elements may be organically connected to each other to operate.

According to an embodiment, the timer may measure the time period for which the user maintains specific brightness while the electronic device is in an active state. The active state may be a state in which the display is operating and is configured in the automatic brightness mode. According to an embodiment, since the state in which a manual brightness mode is configured is not the active state, the use time in the manual brightness mode may not be used. The electronic device may measure the use time after switching to the automatic brightness mode on the basis of the user input.

According to an embodiment, the timer may receive information on the use of display screen brightness by the user from the data module. The timer may measure the accumulated use time for each brightness on the basis of the received information. For example, the timer may receive information on a user's touch input among information collected by the data module. When no touch input is received for a reference time or longer, it may be considered that the electronic device is not being used and measurement of the use time may be suspended. Thereafter, when the touch input is received again, it may be considered that the user starts using the electronic device again and measurement of the use time may be resumed.

According to an embodiment, the electronic device may collect and store at least one of illuminance information and display brightness attributes received from the illuminance sensor and the accumulated use time measured by the time through the data module. The display brightness attributes may include at least one of brightness continuity for each illuminance section, a brightness use pattern in night mode, a brightness use pattern for each application being executed in the foreground, a brightness use pattern for each color (color temperature), a brightness use pattern according to a battery level, and a frequency of user touch inputs when a specific application is being used. For example, when the user frequently uses an application having a white UI, the electronic device may detect how the user configures display screen brightness when using the white UI so as to generate a brightness use pattern for the color and transmit information thereon to the data module.

According to an embodiment, the electronic device may transmit information stored in the data module to each element of the electronic device including at least one of the timer, the time statistics module, and the continuity statistics module. The elements of the electronic device are organically connected to each other, and calculations performed by each module may be performed on the basis of information stored in the data module. For example, the time weighted value calculated by the time statistic module may need information on a level and a use time of display brightness in a specific illuminance environment. The electronic device may collect relevant information and transmit required information to the time statistics module via the data module.

According to an embodiment, the time statistics module may calculate the time weighted value by collecting information on the accumulated use time for each illuminance. The time weighted value may be determined in proportion to the time period during which the user uses the corresponding brightness. For example, as specific brightness is used longer, a higher weighted value is assigned.

According to an embodiment, the time statistics module may receive brightness change event information and information on the brightness use pattern of the user from the data module and the timer. The time statistics module may receive information on the accumulated use time for each illuminance measured by the timer and calculate the time weighted value on the basis thereof.

According to an embodiment, the continuity statistics module may calculate the continuity weighted value by collecting information on the brightness use pattern of the user. The continuity weighted value may be a value obtained by analyzing a brightness use pattern of the user in specific illuminance. For example, by reflecting preference of the user to use high display screen brightness in a low illuminance environment in calculations of the continuity weighted value, it is possible to assign a high continuity weighted value to maintenance of high screen brightness even in the low illuminance environment.

According to an embodiment, the electronic device may calculate the brightness weighted value by adding the time weighted value ($T_n$) and the continuity weighted value ($C_n$). For example, when the use time is 10 hours and the event continuity value is 30, the brightness weighted value may be calculated as 40. The brightness weighted value may determine how much the corresponding brightness value is important to be reflected in reconfiguration of brightness data.

According to an embodiment, the electronic device may reconfigure brightness data. Information on the brightness change event may be stored in the memory for every illuminance section, and the electronic device may calculate the brightness weighted value by using the information and reconfigure brightness data.

According to an embodiment, the time statistics module and the continuity statistics module may transmit the collected information on the accumulated use time for every illuminance section, the user brightness use pattern, and the calculated brightness weighted value to the brightness configuration module.

According to an embodiment, when the user changes brightness to a value other than the value mapped to default brightness data at a specific illuminance, the electronic device may generate temporary brightness data in the brightness configuration module. The brightness configuration module may generate temporary brightness data on the basis of the brightness weighted value and the event information received from the time statistics module and the continuity statistics module. Before brightness data is reconfigured when the reset condition is satisfied, the electronic device may change display brightness according to the temporary brightness data generated by the brightness configuration module. For example, information on the current illuminance value may be received from the illuminance sensor, and a brightness value mapped to the corresponding illuminance value in the temporary brightness data generated by the brightness configuration module may be determined as brightness of the display screen. The brightness configuration module may change temporary brightness data whenever a user input is received. Since a plurality of user inputs may be received even before brightness data is reset, the temporary brightness data may be continuously changed. According to an embodiment, when generating temporary brightness data, the brightness configuration module may also change brightness mapped to an illuminance section adjacent to an illuminance section in which brightness is changed by a user input.

According to an embodiment, the reset module may determine whether the reset condition is satisfied. The reset module may receive information on at least one of illuminance information around the electronic device and whether the display operates from the data module. When the reset condition is satisfied, the reset module may determine that the reset condition is satisfied and the brightness data reconfiguration module may support the reconfiguration of the brightness data.

According to an embodiment, the brightness data reconfiguration module may reconfigure brightness data in consideration of all event information reflected by the brightness configuration module in the temporary brightness data, the time weighted value, and the continuity weighted value. According to an embodiment, when reconfiguring brightness data, the brightness data reconfiguration module may also change brightness mapped to the illuminance section adjacent to the illuminance section in which brightness is changed by a user input. When the reset module determines that the reset condition is satisfied, the brightness data reconfiguration module may reconfigure the brightness data. When reconfiguring the brightness data, the brightness data reconfiguration module may initialize temporary brightness data.

According to an embodiment, the brightness data reconfiguration module may process balancing while reconfiguring the brightness data. When brightness is changed only in the illuminance section in which the brightness change event is generated, a reversal phenomenon may occur, and thus the brightness data reconfiguration module may process balancing in order to prevent the reversal phenomenon. For example, the brightness value mapped to the illuminance section adjacent to the illuminance section in which the brightness change event is generated may also be changed.

The electronic device may reconfigure brightness data on the basis of the accumulated use time of the brightness by the user. According to an embodiment, default brightness data may be stored in the memory at the manufacture of the electronic device. Brightness increases as illuminance increases, and the electronic device may acquire illuminance information from the illuminance sensor and determine display brightness as the brightness value mapped to the illuminance value around the electronic device in brightness data.

According to an embodiment, the electronic device may change display brightness on the basis of user input. When the user changes brightness, the electronic device may generate temporary brightness data reflecting the corresponding user input. The electronic device may process balancing by changing not only brightness mapped to illuminance in which a user touch is input but also the brightness value mapped to the adjacent illuminance sections. Before the brightness data is reconfigured since the reset condition is satisfied, the electronic device may determine display brightness as the brightness value mapped to the generated temporary brightness data. For example, the electronic device may determine display brightness as the changed value in the same illuminance environment after the brightness change event is generated.

According to an embodiment, when the reset condition is satisfied, the electronic device may reconfigure the brightness data. The electronic device may reconfigure the brightness data in consideration of at least one of the accumulated use time of brightness by the user, the difference between changed brightness before the reconfiguration and changed brightness after the reconfiguration. The reconfiguration brightness data may be configured to be closer to the temporary brightness data from the brightness data before the reconfiguration.

According to an embodiment, the electronic device may calculate the time weighted value and the continuity weighted value and reconfigure the brightness data on the basis thereof. The electronic device may reconfigure the brightness data in consideration of the used time period of the corresponding brightness. For example, as the used time period is longer in a specific brightness value, brightness data may be reconfigured with a higher weighted value.

The electronic device may reconfigure the brightness data on the basis of brightness configuration continuity of the user. According to an embodiment, default brightness data may be stored in the memory at the manufacture of the electronic device. Brightness increases as illuminance increases, and the electronic device may acquire illuminance information from the illuminance sensor and determine display brightness as the brightness value mapped to the illuminance value around the electronic device in brightness data.

According to an embodiment, the electronic device may change display brightness on the basis of a user input. When the user changes brightness, the electronic device may generate temporary brightness data reflecting the corresponding user input. The electronic device may also change the brightness value mapped to the illuminance section adjacent to the illuminance section in which the user changes brightness in order to prevent the reversal phenomenon.

According to an embodiment, when the reset condition is satisfied, the electronic device may reconfigure the brightness data. The reconfigured brightness data may be located between the brightness data before the reconfiguration and the temporary brightness data. The electronic device may differently configure the shape of the graph in consideration of the continuity weighted value. As the user is more likely to use the changed brightness than the brightness value mapped to the existing brightness data, the brightness data may be reconfigured to be closer to the temporary brightness data. For example, when the user is more likely to use brightness higher than the value mapped to the brightness data in a low illuminance environment and is more likely to use brightness lower than the value mapped to the brightness data in a high illuminance environment, the electronic device may map the higher brightness value to the low illuminance section and map the lower brightness value to the high illuminance section when reconfiguring the brightness data. According to an embodiment, the electronic device may continuously calculate and reflect the continuity weighted value by tracking the use pattern of the user.

According to an embodiment, the electronic device may process balancing by also changing the brightness value mapped to the illuminance section adjacent to the illuminance section in which the user changes the brightness when reconfiguring the brightness data.

According to an embodiment, the electronic device may calculate the continuity weighted value by reconfiguring the brightness data. The electronic device may calculate the continuity weighted value in consideration of at least one of brightness configuration by the user, use time period, brightness configuration according to battery level, brightness configuration according to an application being executed in the foreground or background, brightness configuration according to a color of a displayed UI, and brightness configuration when night mode is executed, or one of combinations of two or more thereof, but it not limited to the above examples.

According to an embodiment, when calculating the continuity weighted value in consideration of the configuration of brightness, the electronic device may calculate the continuity weighted value in consideration of a difference between changed brightness before the reconfiguration and changed brightness after the reconfiguration and/or a time spent until the user changes brightness again. When ambient illuminance of the electronic device is a first illuminance, the electronic device may configure display brightness as a value mapped to first brightness data. Thereafter, when the user changes brightness, the electronic device may generate temporary brightness data and configure the temporary brightness data as the value to which the brightness value is changed in first illuminance. Thereafter, the reset condition is satisfied, and thus the brightness data may be reconfigured. When the brightness data is reconfigured, the user changes brightness, and thus a value larger than the value mapped to the first illuminance in the brightness data before the reconfiguration may be mapped. When the user changes brightness again and the brightness data is reconfigured, the value mapped to the first illuminance may be configured to be higher than the value mapped to the initial brightness data in the reconfigured brightness data.

According to an embodiment, the electronic device may calculate the continuity weighted value in consideration of a difference between brightness that the user changes before the reconfiguration of the brightness data and brightness which the user changes after the reconfiguration. It may be determined that the user is more likely to use the corresponding brightness as the difference between two brightnesses is smaller, and thus a higher continuity weighted value may be assigned. On the other hand, it may be determined that the user is less likely to use the corresponding brightness as the difference between the two brightnesses is larger, and thus a lower continuity weighted value may be assigned. According to an embodiment, when the difference between the two brightnesses is larger than or equal to a predetermined value, the electronic device may calculate the continuity weighted value as 0.

According to an embodiment, the electronic device may calculate the continuity weighted value in consideration of an interval between a time point at which the brightness data is reconfigured and a time point at which the brightness change event of the user is generated after the reconfiguration. It may be determined that the user is more likely to prefer the corresponding brightness as the interval between the two time points is shorter, and thus a higher continuity weighted value may be assigned. On the other hand, it may be determined that the user is less likely to use the corresponding brightness as the interval between the two time points is longer, and thus a lower continuity weighted value may be assigned. According to an embodiment, when the interval between two time points is longer than or equal to a predetermined value, the electronic device may calculate the continuity weighted value as 0.

Figure 8:
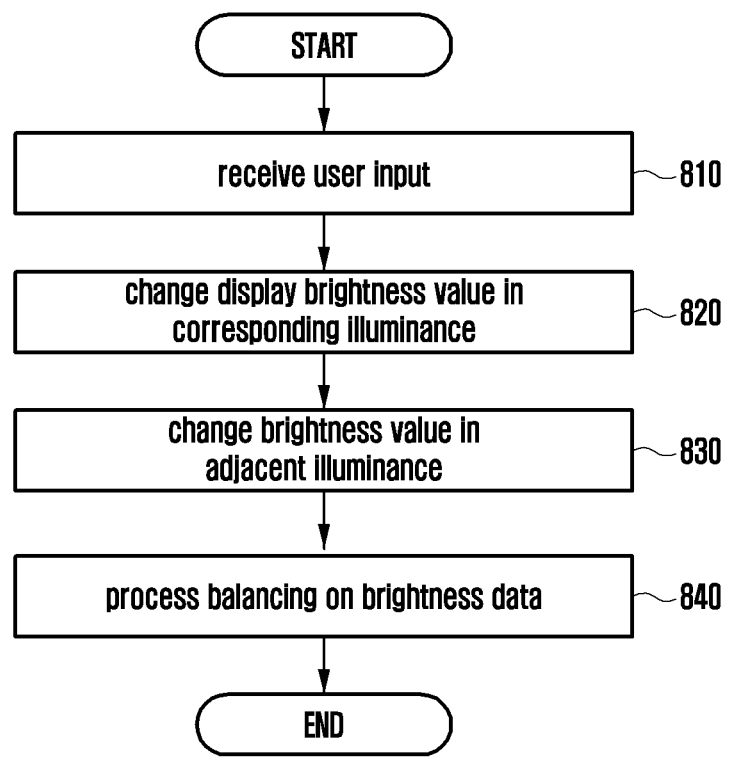
FIG. 8 is a flowchart illustrating a method by which an electronic device generates temporary brightness data according to an embodiment.

FIG. 8 is a flowchart illustrating a method by which an electronic device generates temporary brightness data according to an embodiment.

The illustrated method may be performed by at least one element (for example, the processor 120 of FIG. 1 or the processor 210 of FIG. 2) included in the electronic device (for example, the electronic device 101 of FIG. 1, the electronic device 200 of FIG. 2, or the electronic device 300 of FIG. 3), and a description of the technical features that have been described above may be omitted hereinafter.

According to an embodiment, in operation 810, the electronic device may receive a user input. The user may use the electronic device and then change screen brightness of a display (for example, the display module 160 of FIG. 1 or the display 220 of FIG. 2) in specific illuminance. In operation 820, the electronic device may receive the user input through a touch sensor (for example, the touch sensor 230 of FIG. 2) and change display brightness in operation 820.

According to an embodiment, in operation 830, the electronic device may change a brightness value in an adjacent illuminance section. Before brightness data is reconfigured, the electronic device may generate temporary brightness data obtained by changing the brightness data on the basis of the user input. The electronic device may change display brightness of the electronic device according to a value mapped to the generated temporary brightness data.

According to an embodiment, the temporary brightness data may reflect the brightness changed by the user. For example, unlike brightness data reconfigured using a brightness weighted value calculated based on the brightness changed by the user, brightness changed by the user may be mapped to the temporary brightness data.

According to an embodiment, in operation 840, the electronic device may process balancing of the generated temporary brightness data. The electronic device may change the temporary brightness data on the basis of a user input and also change brightness values mapped to illuminance sections adjacent to the changed illuminance section.

Figure 9:
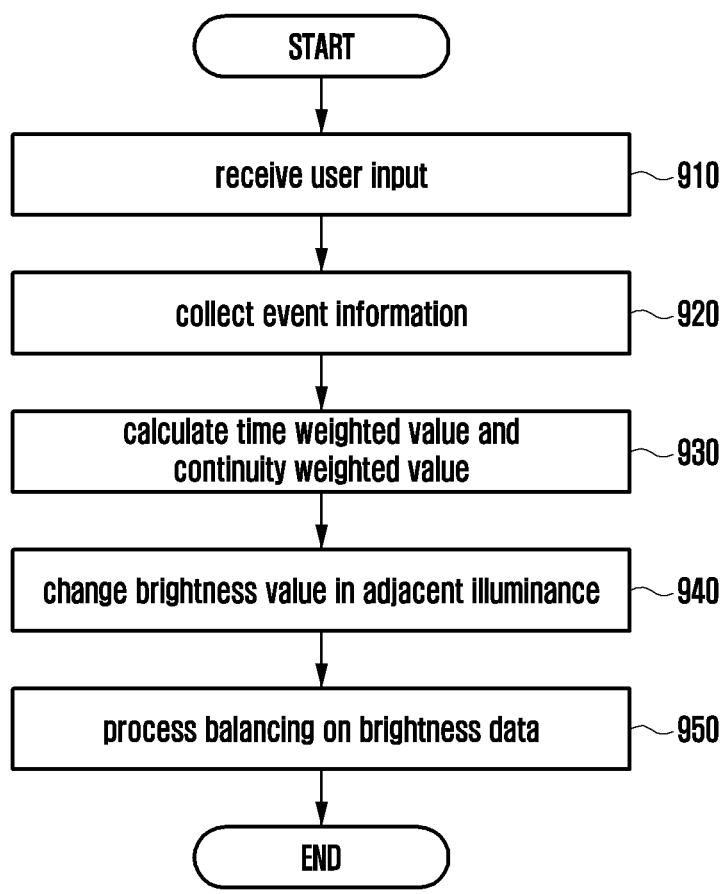
FIG. 9 is a flowchart illustrating a method by which an electronic device reconfigures brightness data according to an embodiment.

FIG. 9 is a flowchart illustrating a method by which an electronic device reconfigures brightness data according to an embodiment.

The illustrated method may be performed by at least one element (for example, the processor 120 of FIG. 1 or the processor 210 of FIG. 2) included in the electronic device (for example, the electronic device 101 of FIG. 1, the electronic device 200 of FIG. 2, or the electronic device 300 of FIG. 3), and a description of the technical features that have been described above may be omitted hereinafter.

According to an embodiment, in operation 910, the electronic device may receive a user input. The user may use the electronic device and then change screen brightness of a display (for example, the display module 160 of FIG. 1 or the display 220 of FIG. 2) in specific illuminance. The electronic device may change display brightness by receiving the user input through a touch sensor (for example, the touch sensor 230 of FIG. 2).

According to an embodiment, in operation 920, the electronic device may collect event information. When a brightness change event of changing display brightness by the user is generated, the electronic device may collect event information on the corresponding event. The event information may include information on at least one of the time at which the user changes brightness, changed brightness, information indicating an environment in which brightness is changed, and the time period for which changed brightness is maintained. The electronic device may divide illuminance at regular intervals or irregular intervals and collect brightness change event information generated for each of the corresponding sections. The electronic device may reconfigure brightness data using the collected event information.

According to an embodiment, in operation 930, the electronic device may calculate a time weighted value and a continuity weighted value. When reconfiguring brightness data, the electronic device may consider the time weighted value and the continuity weighted value calculated on the basis of the accumulated event information. The time weighted value may be proportional to the use time of the changed brightness by the user, and the continuity weighted value may be calculated in consideration of the time spent until brightness is changed again after brightness data is reconfigured in the corresponding illuminance and the difference between brightness that the user changes before the reconfiguration and brightness that the user changes after the reconfiguration.

According to an embodiment, the electronic device may determine whether the reset condition is satisfied. The reset condition may include at least one of non-operation of the display for a reset time period or longer and operation of the display in illuminance different from an illuminance value detected by the illuminance sensor when the display operates last.

According to an embodiment, the electronic device may reconfigure the brightness data when the reset condition is satisfied. The electronic device may reconfigure the brightness data in consideration of temporary brightness data, accumulated event information, and the calculated brightness weighted value.

According to an embodiment, in operation 940, the electronic device may change the brightness value in adjacent illuminance. The user may make a change to smoothen illuminance in the illuminance section in which brightness is changed and an adjacent section.

According to an embodiment, in operation 950, the electronic device may process balancing of the generated brightness data. Display brightness of the electronic device is provided such that lower brightness is provided to an environment when illuminance is lower, and higher brightness is provided to an environment in which illuminance is higher. In order to provide the same, the electronic device may configure brightness to be lower in an illuminance section lower than illuminance in which the user changes brightness and to be higher in an illuminance section higher than illuminance in which the user changes brightness.

A method of controlling brightness by an electronic device according to an embodiment may include an operation of identifying illuminance information from an illuminance sensor, an operation of configuring brightness of a display as a first brightness on the basis of the illuminance information and brightness data relating an ambient illuminance of the electronic device to the brightness of the display, an operation of changing the brightness of the display to a second brightness on the basis of a user input, an operation of acquiring event information for an operation in which the brightness of the display is changed by the user input, an operation of reconfiguring the brightness data stored in a memory on the basis of the event information, and an operation of determining the brightness of the display according to a brightness value mapped in the reconfigured brightness data to the illuminance information identified by the illuminance sensor.

According to an embodiment, the operation of changing the brightness of the display to the second brightness may further include an operation of generating temporary brightness data on the basis of the second brightness, and an operation of determining the brightness of the display according to a brightness value mapped to the illuminance information in the temporary brightness data before the brightness data is reconfigured.

According to an embodiment, the operation of generating the temporary brightness data further include an operation of changing brightness values mapped to illuminance values within a reference range of the illuminance information identified by the illuminance sensor.

According to an embodiment, the operation of reconfiguring the brightness data may further include an operation of calculating a time weighted value and a continuity weighted value, based on the event information and an operation of reconfiguring the brightness data further using the calculated time weighted value and continuity weighted value.

According to an embodiment, the continuity weighted value may be calculated based on a time spent until the brightness of the display is changed again after the brightness data is reconfigured and a difference between brightness changed by a user before the reconfiguration and brightness changed after the reconfiguration.

According to an embodiment, the operation of reconfiguring the brightness data may be performed when the display is not operated for longer than a predetermined reset time period or the display operates in an illuminance different from an illuminance corresponding to the illuminance information identified by the illuminance sensor.

According to an embodiment, the operation of reconfiguring the brightness data may further include an operation of changing brightness values mapped to illuminance values within a reference range of the illuminance information identified by the illuminance sensor.

According to an embodiment, the operation of acquiring the event information may include identifying touch information from a touch sensor and, when a time period for which there is no received touch input is longer than or equal to a reference time period, excluding the time period from calculations of an accumulated use time used in calculating a time weighted value.

According to an embodiment, the illuminance sensor may be configured to measure illuminance in sections divided at predetermined intervals.

According to an embodiment, the operation of acquiring the event information may be performed when the display is operating, the user input is detected by a touch sensor, and an automatic brightness mode is configured.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

The invention claimed is:
1. An electronic device comprising:
a display;
a touch sensor configured to receive a user's touch input and generate touch information;
an illuminance sensor configured to detect ambient illuminance;
a memory configured to store brightness data which maps ambient illuminance values to brightness values of the display; and
a processor operatively connected to the display, the illuminance sensor, the touch sensor, and the memory,
wherein the processor is configured to:
receive a first ambient illuminance value from the illuminance sensor,
set a brightness of the display as a first brightness value, based on the first ambient illuminance value and the brightness data,
change the brightness of the display to a second brightness value, based on a user input requesting a changing of the brightness of the display,
reconfigure the brightness data stored in the memory, such that the first ambient illuminance value is mapped to a third brightness value, based at least in part on the second brightness value, and
set the brightness of the display according to a brightness value in the reconfigured brightness data that is mapped to a second ambient illuminance value received from the illuminance sensor.

2. The electronic device of claim 1, wherein the processor is configured to:
when the brightness of the display is changed to the second brightness value, generate temporary brightness data, based on the second brightness value, wherein the second brightness value is mapped to the first ambient illuminance value.

3. The electronic device of claim 2, wherein the processor is configured to, when generating the temporary brightness data, change brightness values mapped to ambient illuminance values within a reference range.

4. The electronic device of claim 1, wherein the processor is configured to acquire event information for a reset or another user input requesting a change of the brightness and calculate a time weighted value and a continuity weighted value, based on the event information and reconfigure the brightness data further using the calculated time weighted value and the continuity weighted value.

5. The electronic device of claim 4, wherein the processor is configured to calculate the continuity weighted value based on a time spent until the reset or another user input.

6. The electronic device of claim 1, wherein the processor is configured to reconfigure the brightness data when:

the display is not operated for longer than a predetermined reset time period, or the display operates in an illuminance different from an illuminance corresponding to illuminance information identified by the illuminance sensor.

7. An electronic device comprising:
a display;
a touch sensor configured to receive a user's touch input and generate touch information;
an illuminance sensor configured to detect ambient illuminance and generate illuminance information;
a memory configured to store brightness data relating to the ambient illuminance to brightness of the display; and
a processor operatively connected to the display, the illuminance sensor, the touch sensor, and the memory,
wherein the processor is configured to:
identify the illuminance information from the illuminance sensor,
configure brightness of the display as a first brightness, based on the illuminance information and the brightness data,
change the brightness of the display to a second brightness, based on a user input,
acquire event information for an operation in which the brightness of the display is changed by the user input,
reconfigure the brightness data stored in the memory, based on the event information by changing brightness values mapped to illuminance values within a reference range of the illuminance information identified by the illuminance sensor, and
determine the brightness of the display according to a brightness value in the reconfigured brightness data mapped to the illuminance information identified by the illuminance sensor.

8. The electronic device of claim 1, wherein the processor is configured to identify touch information from the touch sensor and, when a time period for which there is no received touch input is longer than or equal to a reference time period, exclude the time period from calculations of an accumulated use time used in calculating a time weighted value.

9. The electronic device of claim 1, wherein the illuminance sensor is configured to measure ambient illuminance in sections divided at predetermined intervals.

10. The electronic device of claim 1, wherein the processor is configured to acquire event information for a reset or another user input requesting a change of the brightness, when the display is operating, the another user input is detected by the touch sensor, and an automatic brightness mode is configured.

11. A method of controlling brightness by an electronic device, the method comprising:
receiving a first ambient illuminance value from an illuminance sensor;
setting a brightness of a display as a first brightness value, based on the first ambient illuminance value and brightness data, wherein the brightness data maps ambient illuminance values to brightness values of the display;
changing the brightness of the display to a second brightness value, based on a user input;
reconfiguring the brightness data stored in a memory, such that the first ambient illuminance value is mapped to a third brightness value, based at least in part on the second brightness value; and
set the brightness of the display according to a brightness value in the reconfigured brightness data that is mapped to a second ambient illuminance value received from the illuminance sensor.

12. The method of claim 11, wherein changing of the brightness of the display to the second brightness value further comprises:
generating temporary brightness data, based on the second brightness value.

13. The method of claim 12, wherein the generating of the temporary brightness data further comprises changing brightness values mapped to ambient illuminances values within a reference range.

14. The method of claim 11, further comprising acquiring event information for a reset or another user input requesting a change of the brightness and wherein the reconfiguring of the brightness data further comprises calculating a time weighted value and a continuity weighted value, based on the event information and reconfiguring the brightness data further using the calculated time weighted value and continuity weighted value.

15. The method of claim 14, wherein the continuity weighted value is calculated based on a time spent until the brightness of the reset or another user input.

16. The method of claim 11, wherein reconfiguring of the brightness data is performed when:
the display is not operated for longer than a predetermined reset time period, or
the display operates in an illuminance different from an illuminance corresponding to illuminance information identified by the illuminance sensor.

17. A method of controlling brightness by an electronic device, the method comprising:
identifying illuminance information from an illuminance sensor;
configuring brightness of a display as a first brightness, based on the illuminance information and brightness data;
changing the brightness of the display to a second brightness, based on a user input;
acquiring event information for an operation in which the brightness of the display is changed by the user input;
reconfiguring the brightness data stored in a memory, based on the event information; and
determining the brightness of the display according to a brightness value in the reconfigured brightness data mapped to the illuminance information identified by the illuminance sensor,
wherein reconfiguring of the brightness data further comprises changing brightness values mapped to illuminance values within a reference range of the illuminance information identified by the illuminance sensor.

18. The method of claim 17, wherein acquiring of the event information comprises identifying touch information from a touch sensor and, when a time period for which there is no received touch input is longer than or equal to a reference time period, excluding the time period from calculations of an accumulated use time used in calculating a time weighted value.

19. The method of claim 11, wherein the illuminance sensor is configured to measure ambient illuminance in sections divided at predetermined intervals.

20. The method of claim 11, further comprising acquiring event information for a reset or another user input requesting a change of the brightness is performed when the display is operating, the another user input is detected by a touch sensor, and an automatic brightness mode is configured.

\* \* \* \* \*

UNITED STATES PATENT AND TRADEMARK OFFICE
CERTIFICATE OF CORRECTION

PATENT NO.         : 11,908,424 B2
APPLICATION NO.    : 17/577545
DATED              : February 20, 2024
INVENTOR(S)        : Minho Kim et al.

Page 1 of 1

It is certified that error appears in the above-identified patent and that said Letters Patent is hereby corrected as shown below:

In the Claims

Column 36, Claim 15, Lines 24-25 should read as follows:
--. . .until the reset or another user input.--

Signed and Sealed this
Thirtieth Day of April, 2024

Katherine Kelly Vidal
*Director of the United States Patent and Trademark Office*